(12) United States Patent
Iyer et al.

(10) Patent No.: US 10,771,509 B2
(45) Date of Patent: Sep. 8, 2020

(54) TERMINAL INTEROPERATION USING CALLED-TERMINAL FUNCTIONAL CHARACTERISTICS

(71) Applicant: T-Mobile USA, Inc., Bellevue, WA (US)

(72) Inventors: Karthik Iyer, Bellevue, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 251 days.

(21) Appl. No.: 15/476,299

(22) Filed: Mar. 31, 2017

(65) Prior Publication Data

US 2018/0288105 A1 Oct. 4, 2018

(51) Int. Cl.
*H04L 29/06* (2006.01)
*H04W 4/12* (2009.01)

(52) U.S. Cl.
CPC ...... *H04L 65/1069* (2013.01); *H04L 65/1006* (2013.01); *H04L 65/80* (2013.01); *H04W 4/12* (2013.01)

(58) Field of Classification Search
CPC . H04L 65/1069; H04L 65/80; H04L 65/1006; H04L 67/24; H04M 1/72519; H04W 4/12; H04W 88/06
See application file for complete search history.

(56) References Cited

U.S. PATENT DOCUMENTS 6,785,263 B1 8/2004 Morinaga et al.
7,768,998 B1 8/2010 Everson et al.
9,749,844 B1 8/2017 Sovani et al.
2003/0229699 A1 12/2003 Moran et al.
2004/0264482 A1 12/2004 Kang et al.
2007/0135146 A1 6/2007 Rezaiifar et al.

(Continued)

FOREIGN PATENT DOCUMENTS

CN 101278278 10/2008
CN 101534229 9/2009

(Continued)

OTHER PUBLICATIONS

Rich Communication Suite 6.0 Advanced Communications—RCC. 07_v7.0 _final_draft Feb. 19, 2016 (Year: 2016).*

(Continued)

*Primary Examiner* — June Y Sison
(74) *Attorney, Agent, or Firm* — Lee & Hayes, P.C.

(57) ABSTRACT

Example techniques described herein can permit interoperation between network terminals that have different performance characteristics, or that are connected via access networks having different performance characteristics. A calling terminal (or a core network device) can retrieve an indication of functional characteristics associated with a called terminal. The indication can be included in presence information associated with the called terminal. The calling terminal can determine a altered functional specification based at least in part on the functional characteristics and a functional specification of a session. The functional characteristics can satisfy the altered functional specification. The calling terminal can initiate a altered session with the called terminal via the network based at least in part on the altered functional specification. A terminal can detect network service provided by an access network and transmit presence information to a presence-information server. The presence information can indicate a type of the access network.

20 Claims, 10 Drawing Sheets

(56) References Cited

U.S. PATENT DOCUMENTS

| | | | |
|---|---|---|---|
| 2007/0211683 | A1 | 9/2007 | Shaheen et al. |
| 2008/0062253 | A1* | 3/2008 | Jaspersohn ......... H04M 7/0072 348/14.11 |
| 2008/0080685 | A1 | 4/2008 | Barnes et al. |
| 2008/0160996 | A1 | 7/2008 | Li et al. |
| 2008/0240091 | A1 | 10/2008 | Kesavan et al. |
| 2009/0006533 | A1 | 1/2009 | Guo |
| 2009/0092061 | A1 | 4/2009 | Shen |
| 2009/0154658 | A1 | 6/2009 | Kasper et al. |
| 2009/0201910 | A1 | 8/2009 | Kumarasamy et al. |
| 2009/0210743 | A1 | 8/2009 | Gu et al. |
| 2009/0221310 | A1 | 9/2009 | Chen et al. |
| 2010/0054159 | A1 | 3/2010 | Zhu et al. |
| 2010/0125631 | A1 | 5/2010 | Zhang et al. |
| 2010/0144325 | A1 | 6/2010 | Roundtree et al. |
| 2010/0150141 | A1 | 6/2010 | Lee |
| 2010/0154029 | A1 | 6/2010 | Fernandez Alonso et al. |
| 2010/0272072 | A1 | 10/2010 | Bienn et al. |
| 2011/0010768 | A1 | 1/2011 | Barriga et al. |
| 2011/0047282 | A1 | 2/2011 | Denman et al. |
| 2011/0136483 | A1 | 6/2011 | Dwight et al. |
| 2011/0222532 | A1 | 9/2011 | Noldus |
| 2011/0310884 | A1 | 12/2011 | Arauz-Rosado |
| 2012/0002718 | A1 | 1/2012 | Jun et al. |
| 2012/0185600 | A1 | 7/2012 | Belling et al. |
| 2012/0225652 | A1* | 9/2012 | Martinez ........... H04M 3/42374 455/435.1 |
| 2012/0244861 | A1 | 9/2012 | Agarwal et al. |
| 2013/0021998 | A1 | 1/2013 | Shatsky |
| 2013/0024332 | A1 | 1/2013 | Cai et al. |
| 2013/0212293 | A1 | 8/2013 | Friedman |
| 2013/0223304 | A1 | 8/2013 | Tanaka et al. |
| 2013/0246052 | A1 | 9/2013 | Tanaka et al. |
| 2013/0290494 | A1 | 10/2013 | Goudarzi et al. |
| 2014/0149562 | A1* | 5/2014 | Xiao .................. H04L 41/0879 709/222 |
| 2014/0328323 | A1 | 11/2014 | Zhang et al. |
| 2014/0342739 | A1 | 11/2014 | Hori |
| 2014/0372557 | A1* | 12/2014 | Buckley ................ H04L 67/104 709/217 |
| 2015/0063346 | A1 | 3/2015 | Eswara et al. |
| 2015/0131652 | A1 | 5/2015 | Telikepalli et al. |
| 2015/0172349 | A1 | 6/2015 | Gonzalez De Langarica et al. |
| 2015/0350983 | A1 | 12/2015 | Kwok et al. |
| 2015/0358809 | A1 | 12/2015 | Lau et al. |
| 2016/0021336 | A1 | 1/2016 | Abbott et al. |
| 2016/0028790 | A1 | 1/2016 | Eriksson et al. |
| 2016/0072868 | A1 | 3/2016 | Poulin |
| 2016/0105468 | A1 | 4/2016 | Mufti et al. |
| 2016/0127295 | A1 | 5/2016 | Karimli et al. |
| 2016/0142447 | A1 | 5/2016 | Mufti et al. |
| 2016/0308919 | A1 | 10/2016 | Hori |
| 2016/0323425 | A1 | 11/2016 | Atarius et al. |
| 2018/0026746 | A1 | 1/2018 | Bruhn et al. |
| 2018/0048748 | A1 | 2/2018 | Lundstrom et al. |
| 2018/0176266 | A1 | 6/2018 | Filart |
| 2019/0173925 | A1 | 6/2019 | Mufti et al. |

FOREIGN PATENT DOCUMENTS

| | | |
|---|---|---|
| CN | 102025715 | 4/2011 |
| CN | 102347950 | 2/2012 |
| EP | 2081349 | 7/2009 |
| EP | 2782386 A1 | 9/2014 |
| WO | WO03032585 A1 | 4/2003 |
| WO | WO2015129181 A1 | 9/2015 |
| WO | WO2016081430 | 5/2016 |

OTHER PUBLICATIONS

Extended European Search Report dated Feb. 28, 2018 for European Patent Application No. 15849735.4, 9 pages.

PCT Search Report and Written Opinion dated Jan. 26, 2018 for PCT Application No. PCT/US17/54320, 14 pages.

"ETSI TS 123 334 v 13.5.0, Technical Specification", Apr. 2016, pp. 1, 4-8, 10-18, 29-46.

"ETSI TS 126 171 v13.0.0, Technical Specification", Jan. 2016, 14 pages.

"ETSI TS 126 190 v13.0.0, Technical Specification", Jan. 2016, pp. 1, 4-8, 13-14, 50-51.

"ETSI TS 126 201 v13.0.0, Technical Specification", Jan. 2016, 25 pages.

"ETSI TS 126 202 v13.0.0, Technical Specification", Jan. 2016, 15 pages.

"ETSI TS 126 441 v13.0.0, Technical Specification", Jan. 2016, 14 pages.

"ETSI TS 126 445 v 13.1.0, Technical Specification", May 2016, pp. 1, 4-16, 17, 20-24, 415-416, 443-445, 606-625, 636, and 638-654.

"ETSI TS 126 446 v 13.0.0, Technical Specification", Jan. 2016, 10 pages.

"EVS Registration IANA" retrieved Jul. 28, 2016, at <<https://www.iana.org/assignments/media-types/audio/EVS>>, 4 pages.

"H.248", Wikipedia, retrieved on Dec. 20, 2016 from <<https://en.wikipedia.org/wiki/H.248>>, 6 pages.

Jarvinen, K., "Enhanced Voice Services Codec for LTE", retrieved Jul. 12, 2016 at <<http://www.3gpp.org/news-avents/3gpp-news/1639-evs_news>>, 2 pages.

"Multimedia Messaging Service", Wikipedia, retrieved May 24, 2017 from <<https://en.wikipedia.org/wiki/Multimedia_Messaging_Service>>, 5 pages.

Office action for U.S. Appl. No. 15/280,234, dated Feb. 9, 2017, Filart et al., "Network-Terminal Interoperation Using Compatible Payloads", 23 pages.

Office Action for U.S. Appl. No. 14/788,591, dated May 2, 2017, Mufti et al., "Service Capabilities in Heterogeneous Network", 22 pGES.

PCT Search Report and Written Opinion dated Jan. 22, 2016 for PCT application No. PCT/US2015/054233, 15 pages.

"Presence Simple Specification", Open Mobile Alliance, Version 2.0, Jul. 10, 2012, 102 pages.

"Rich Communication Services", Wikipedia, retrieved May 24, 2017, from <<https://en.wikipedia.org/wiki/Rich_Communication_Services>>, 9 pages.

Rosenberg, J., "A Presence Event Package for the Session Initiation Protocol (SIP)", Standards Track, Request for commments: 3856, Aug. 2004, 27 pages.

Schulzrinne, Hand T. Taylor, "RTP Payload for DTMF Digits, Telephony Tones, and Telephony Signals", The IETF Trust, Dec. 2006, 49 pages.

Schulzrinne, H., et al., "RPID: Rich Presence Extensions to the Presence Information Data Forma (PIDF)", Standards Track, Request for Comments: 4480, Jul. 2006, 37 pages.

Sjoberg, J., et al., "RTP Payload Format and File Storage Forma for the Adaptive Multi-Rate (AMR) and Adaptive Multi-Rate Wideband (AMR-WB) Audio Codecs", RFC 4867 (Standards Track), Apr. 2007, pp. 1-4, 13-34, 44-47.

Sugano, H., et al., "Presence Information Data Format (PIDF)", Standards Track, Request for Comments: 3863, Aug. 2004, 28 pages.

"Volte—Some Thoughts on codec Negotiation", retrieved Jul. 28, 2016, from <<https://blog.wirelessmoves.com/2016/03/volte-some-thoughts-on-Codec-negotiation.html>>, 3 pages.

"What You Really Need to Know About Video Conferencing Systems", retrieved Feb. 24, 2017 from <<http://www.c21video.com/whitepapers/what_to_know_about_video_conferencing.html>>, 12 pages.

Office action for U.S. App. No. 15/386,436, dated 05/312/2018, Filart et al., "Network Core Facilitating Terminal Interoperation ", 39 pages.

Office Action for U.S. Appl. No. 15/386,436, dated Nov. 16, 2018, Filart, "Network Core Facilitating Terminal Interoperation", 41 pages.

Office action for U.S. Appl. No. 15/280,234, dated Jul. 3, 2017, Filart et al., "Network-Terminal Interoperation Using Compatible Payloads", 27 pages.

(56) References Cited

OTHER PUBLICATIONS

Office Action for US Patent Application, dated Aug. 18, 2017, Mufti, "Service Capabilities in Heterogeneous Network" 34 pages.
"RCS Interworking Guidelines", GSM Association, Official Document IR 90, Version 13 0, May 6, 2016, pp. 1-3 and 11-16.
"RCS Universal Profile Service Definiition Document", GSM Association, Official Document RCC.71, Version 1.0, Nov. 16, 2016, pp. 1-5 and 97-122.
"Real Time Communication—Messaging in RCS", retrieved Aug. 22, 2017, from <<https://realtimecommunication.wordpress.com/2014/11/14/messaging-in-rcs/>>, 12 pages.
Roach, A.B., "Session Initiation Protocol (SIP)—Specific Event Notification", Request for Comments 3265, Standards Track, Jun. 2002, pp. 3-7, 14-15, 18-19, and 21-27.
Rosenberg, J., et al., "An Offer/Answer Model with the Session Description Protocol (SDP)", Request for Comments 3264, Standards Track, Jun. 2002, pp. 1-5, 9, and 12-19.
Rosenberg, J., et al., "SIP: Session Initiation Protocol", Request for Comments 3261, Standards Track, Jun. 2002, pp. 1-8 and 66-68.
PCT Search Report and Written Opinion dated Apr. 13, 2018 for PCT Application No. PCT/US17/64514, 14 pages.
ETSI TS 126 114 V13.4.0, "Universal Mobile Telecommunications System (UMTS); LTE; IP Multimedia Subsystem (IMS); Multimedia Telephony; Media Handling and Interaction", Aug. 2016, pp. 236-240.
Office Action for U.S. Appl. No. 15/386,436, dated May 30, 2019, Filart, "Network Core Facilitating Terminal Interoperation", 32 pages.
Extended European Search Report dated Dec. 20, 2019 for European Patent Application No. 17857504.9, 10 pages.
Final Office Action dated Feb. 5, 2020 for U.S. Appl. No. 15/386,436 "Network Core Facilitating Terminal Interoperation" Filart, 28 pages.
Chinese Seach Report dated Aug. 28, 2019 for Chinese Patent Application No. 201580064492.3, 18 pages/.
Extended European Search Report dated Apr. 1, 2020 for European Patent Application No. 17883216.8, a counterpart of U.S. Appl. No. 15/386,436, 9 pages.

* cited by examiner

TERMINAL INTEROPERATION USING CALLED-TERMINAL FUNCTIONAL CHARACTERISTICS

BACKGROUND

A computing device configured for telecommunications, such as a wireless smartphone or other terminal, is generally capable of providing a user various communications services. However, some services have service-specific requirements, which may not be supported by all access networks to which the terminal can connect. This can restrict a user's ability to access particular services, or overload lower-performance access networks participating in sessions with higher-performance access networks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. The attached drawings are for purposes of illustration and are not necessarily to scale. For brevity of illustration, in the diagrams herein, an arrow beginning with a diamond connects a first component or operation (at the diamond end) to at least one second component or operation that is or can be included in the first component or operation.

DETAILED DESCRIPTION

Overview

Figure 1:
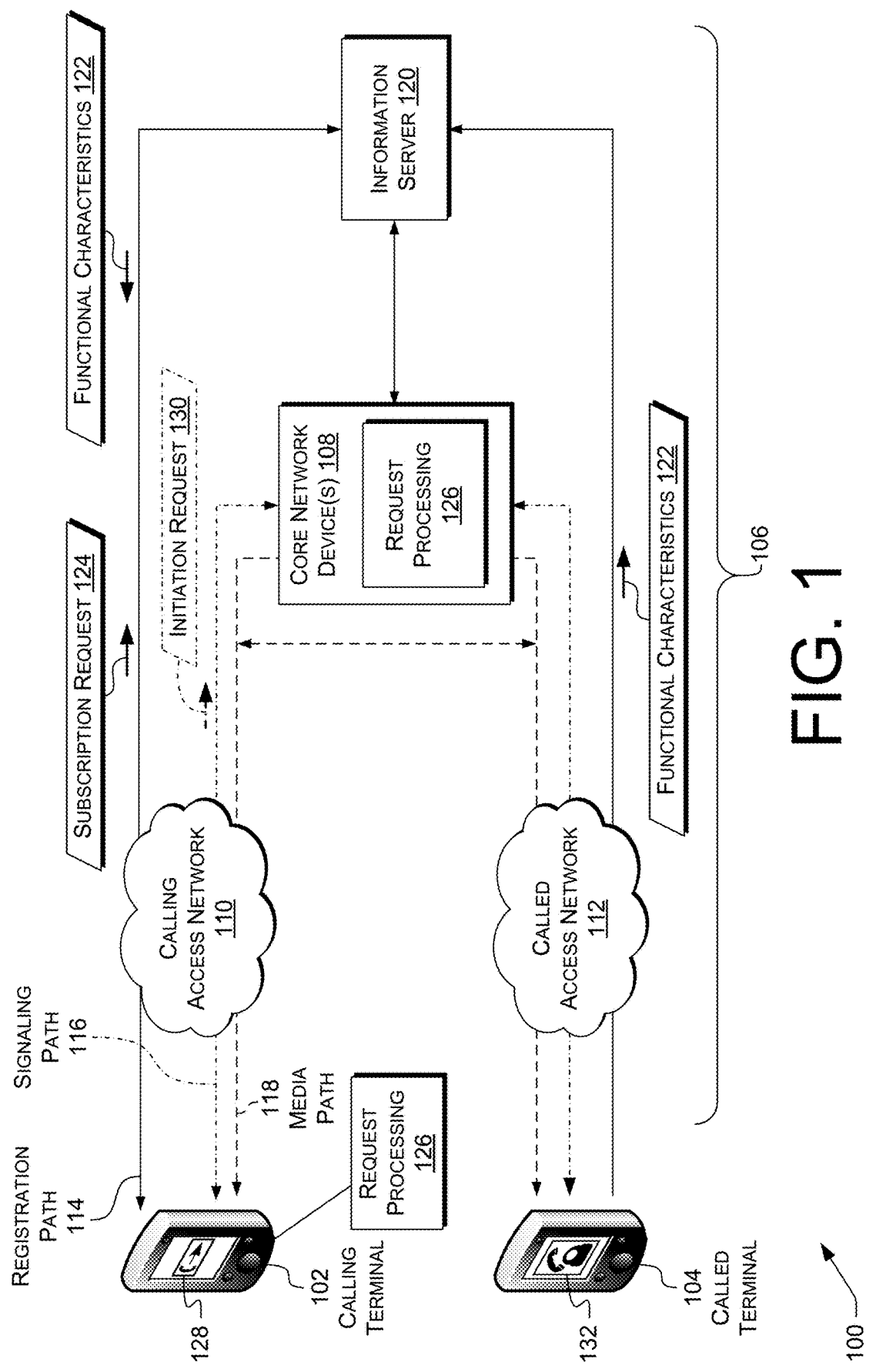
FIG. 1 is a block diagram illustrating a telecommunication system according to some implementations.

Systems and techniques described herein permit computing devices to more efficiently communicate via telecommunications networks. The term "session" as used herein includes a communications path via at least one telecommunications network for exchange of data among two or more computing devices, referred to for brevity as "terminals." Example sessions include voice and video calls, e.g., by which human beings converse, a data communication session, e.g., between two electronic systems or between an electronic system and a human being, or a Rich Communication Services (RCS) session. In connectionless applications, such as Short Message Service (SMS) sessions or Session Initiation Protocol (SIP) MESSAGE-based sessions, a session can include at least one SMS message among a particular set of terminals. In many networks, these and other types of sessions are facilitated by respective, different core network devices, e.g., Application Servers (ASes). For example, RCS services can be facilitated by an RCS Messaging Server (RMS).

Modern telecommunications networks typically include a core network connected via access networks to terminals. Example access networks carrying traffic of sessions can include second-generation (2G) cellular networks such as the Global System for Mobile Communications (GSM) and third-generation (3G) cellular networks such as the Universal Mobile Telecommunications System (UMTS). Other example networks include fourth-generation (4G) cellular networks, such as Long Term Evolution (LTE) carrying voice over LTE (VoLTE) sessions using SIP signaling, the PSTN using Signaling System 7 (SS7) signaling, and data networks. Example data networks can include Institute of Electrical and Electronics Engineers (IEEE) 802.11 ("WIFI") networks carrying voice over Internet Protocol (VoIP) calls or other over-the-top (OTT) sessions encapsulating, e.g., voice or video data in a way transparent to an underlying packet transport. Other example networks carrying sessions can include Internet Protocol (IP) Multimedia Subsystem (IMS)-based networks, which can have various types of access networks, e.g., LTE or WIFI access networks. Accordingly, example access networks include LTE (e.g., the Evolved UMTS Terrestrial Radio Access Network or EUTRAN), WIFI, GSM EDGE Radio Access Network (GERAN), UMTS Terrestrial Radio Access Network (UTRAN), and other cellular access networks.

In any particular communication session, a calling terminal may be connected to the telecommunications network via a calling access network of a first type, e.g., LTE. A called terminal may be connected to the network via a called access network of a second type, e.g., 2G. Therefore, the calling terminal may be able to transmit much more data per second than the called access network can relay, or the calling terminal may be able to transmit data in formats that cannot be carried on the called access network. This can result in overload of the called access network, session failure at the calling terminal, a degraded user experience at either terminal, increased packet loss, or increase bandwidth usage by retry and flow-control messages.

In some examples, a calling terminal or a core network device can "alter" a session to permit intercommunication, e.g., without degradation or loss, or with altered degradation or loss. As used herein, "altering" and similar terms refer to determining characteristics of, or conducting, a session that is supported by the least capable of the access networks carrying data of, or otherwise involved in, the session. Performing such a determination can be referred to as "altering a session" or as an "alteration" of a session. Conducting an altered session can include "altering" data of the session, e.g., receiving data from the calling terminal and determining corresponding data to forward to the called terminal. The determined data can accord with characteristics of the altered session and can be less likely to overload or be rejected by the called access network. The term "alter" permits, but does not require, that the amount of data to be transmitted be smaller after alteration. For example, altering a text message from RCS to SMS may not change the number of text characters to be sent. Instead, such alteration may merely change the headers and arrangement of the transmission including those characters. In some examples, altering data of a session may increase the total number of bytes to be transmitted, e.g., if a standard used in the altered session has a higher volume of headers or a lower compression ratio than a standard that would be used in a non-altered session.

Throughout this document, reference is made to altering data from a calling terminal for communication with a called terminal. However, techniques described herein can also be used to alter data from a called terminal, should the calling access network or the calling terminal be less capable than the called access network or the called terminal. For example, techniques described herein can be used by a core network device during an offer-answer exchange in the pre-establishment phase of a session to improve interoperability between terminals.

In some examples, the called terminal reports functional characteristics associated with the called terminal to an information server, such as a SIMPLE (SIP for Instant Messaging and Presence Leveraging Extensions) presence server or other presence server. For example, the functional characteristics can represent attributes of the called access network that restrict what types of sessions the called terminal can participate in. In some examples, the functional characteristics can represent performance values such as bandwidth or throughput caps. The calling terminal (or a core network device, and likewise throughout this para.) retrieves the functional characteristics from the presence server. If the functional characteristics do not satisfy a functional specification associated with a session to be established, the calling terminal determines an altered functional specification that the functional characteristics do satisfy. For example, the calling terminal may alter the resolution of images or video, or convert an RCS real-time chat to an exchange of SMS messages. In some examples, the calling terminal may alter transparently to the user of the called terminal.

Various examples herein proactively alter overload of lower-performance access networks. This can alter the number of retries and lost packets, improving the efficiency of data transfers in sessions between devices connected via access networks having different functional characteristics. Various examples herein permit altered sessions to proceed even if higher-performance sessions would fail, permitting communication between terminals when such communication might otherwise not be possible.

Illustrative Examples

FIG. 1 is a block diagram illustrating a telecommunication system 100 according to some examples. The system includes computing devices 102 and 104, e.g., user equipment or other mobile phones or communications devices or terminals, communicatively connectable with a telecommunications network 106. The computing devices 102 and 104 can be operated, e.g., by a first user and a second user respectively (not shown). The computing devices 102 and 104 are communicatively connected to one or more core network device(s) 108, e.g., via respective access networks 110 and 112. For brevity, access networks 110 and 112 are referred to herein as "calling" and "called" access networks, respectively, by analogy with the calling terminal (computing device 102) and the called terminal (computing device 104). The core network device(s) 108 can include, e.g., one or more ASes, such as an RMS or a telephony application server (TAS). Access networks 110 and 112 can include, e.g., LTE access networks, WIFI networks, or access networks of other types described herein. For brevity, other components of telecommunications network 106 are omitted. For example, a serving call session control function (S-CSCF) can relay communications from computing device 102 between access network 110 and core network device 108, e.g., an AS.

The computing devices 102 and 104 can be implemented as any suitable mobile computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the computing devices 102 and 104 as being "mobile" or "wireless," (e.g., configured to be carried and moved around), it is to be appreciated that the computing devices 102 and 104 can represent various types of communication devices that are generally stationary as well, such as televisions, desktop computers, game consoles, set top boxes, and the like. In this sense, the terms "communication device," "wireless device," "wireline device," "mobile device," "computing device," "user equipment (UE)," and "terminal" may be used interchangeably herein to describe any communication or computing device capable of performing techniques described herein with respect to, e.g., computing devices 102 and 104. For example, some computing devices can be capable of communicating via multiple access networks, and can register via one or more of those networks at any particular time.

Computing devices 102 and 104 can communicate at least three types of information: registration information, signaling information, and media information. In the illustrated example, registration information is carried via registration path 114, depicted using solid lines. Signaling information is carried via signaling path 116, depicted using dash-dotted lines. Media information is carried via media path 118, depicted using dashed lines. For brevity, registration path 114 is depicted as also carrying presence information (or other information relating to functional characteristics or specifications, and likewise throughout this para.). However, in some examples, presence information can additionally or alternatively be carried via signaling path 116, or via a dedicated path (omitted for brevity). The illustrated paths can represent different packet flows along a common network, along different networks, or any combination thereof.

Registration information can include information useful for establishing that a computing device 102 or 104 is eligible to receive service, e.g., SIP REGISTER or SUBSCRIBE requests, or 802.1X, RADIUS, or Diameter authentication-protocol messages. Signaling information can include information relating to call setup and teardown, e.g., SIP INVITE or BYE requests, or SIP 100 Trying, 180 Ringing, 183 Session Progress, or 200 OK responses. Media information can include audio, video, or other user-specified or user-accessible data of a communication session, e.g., carried via the Real-time Transport Protocol (RTP) and encoded using a selected codec. Nonlimiting example codecs can include an adaptive multi-rate (AMR) or International Telecommunications Union (ITU) G.711 audio codec, or an ITU H.263 or Moving Picture Experts Group (MPEG) MPEG-4 video or audiovisual codec.

In some examples, presence information can include information regarding whether a user is reachable via a terminal, e.g., state information such as "Available," "In a Meeting," "Out of Office," or "Out to Lunch." Presence information can additionally or alternatively include other information that can change without interaction with, or direction from, the telecommunications network 106, e.g., a user's mood or willingness to receive instant messages.

In some examples herein, presence information can additionally or alternatively include information of functional characteristics associated with the terminal. For example, the presence information can include an indication of the type of access network via which the terminal is presently connected (e.g., 2G, 3G, LTE, or WIFI). The indication can be carried, e.g., in an information element or capability.

The presence information can additionally or alternatively include an indication of at least one of: whether the terminal is presently roaming in a cellular or other access network, or whether the access network (e.g., a cellular network) is a premium network with respect to the called terminal. A terminal can be roaming, e.g., when the terminal is connected via an access network operated by a network operator other than the terminal's home operator. Roaming or premium networks may apply surcharges, so a user may wish to use less data while in such an access-network environment. The presence information can additionally or alternatively include an indication of a maximum bit rate the terminal's access network can support, e.g., for any transfer, for video, or for data. In some examples, the presence information can include binary values or other flags, e.g., indicating whether or not a user is available for RCS chat, instant messaging, file transfers, voice calls, video calls, or other types of sessions. The presence information can additionally or alternatively include an indication of a signal strength or other quality of network coverage at the terminal.

In some examples, the presence information can include or omit specific information depending on functional characteristics of or constrained by an access network. For example, a terminal roaming in an access network that does not support RCS can omit RCS-related capabilities from its presence informatio.

In some examples, the presence information can include enumerated or string values having more than two possibilities, e.g., values indicating the access-network type. Examples are shown in Table 1. Additionally or alternatively, the presence information can include at least one bitfield or other set of values, at least some of which are not mutually exclusive. Additionally or alternatively, the presence information can include at least one key-value pair. Additionally or alternatively, the presence information can include analog values, e.g., expressed in fixed-point or floating-point formats, or as strings, or numerical values, e.g., integer or floating-point. For example, the presence information can include a number indicating a cap on the number of bytes that can be transmitted in a single session.

TABLE 1

| Access-Network Type | Enumerated Value | String Value |
|---|---|---|
| 2G | 0 | "2G" |
| 3G | 1 | "3G" |
| LTE | 2 | "4G-LTE" |
| WIFI | 3 | "802.11" |
| Roaming | 4 | "ROAM" |

In some examples, the presence information can include combinations of any of the types of values described in the preceding paragraph or in Table 1. For example, in an example using values listed in Table 1, the presence information can include an indication of the Roaming type if the terminal is roaming, along with an indication of the specific type of the access network in which the terminal is roaming, e.g., 2G or 3G. In another example using values from Table 1, enumerated values of 0, 1, 2, and 3 can indicate the associated access-network type in a non-roaming scenario, and enumerated values of 4, 5, 6, and 7 can indicate 2G, 3G, LTE, and WIFI, respectively, in a roaming scenario (e.g., LTE+roaming=2+4=6).

In some examples, core network device 108 or a computing device 102 or 104 can be configured to communicate with an information server 120. Information server 120 can be or include a presence server, e.g., a SIMPLE or Open Mobile Alliance (OMA) presence server. Information server 120 can additionally or alternatively be or include an authorization or authentication server, e.g., a home location register (HLR)/home subscriber server (HSS). Core network device 108 can communicate with information server 120, e.g., via the SIP or Diameter protocols or other protocols, e.g., over the LTE Sh interface or other appropriate interfaces.

In some examples of information server 120 being or including a presence server, information server 120 can be configured to receive presence information from a computing device 102 or 104, e.g., via a SIP PUBLISH request. The computing device 102 or 104 can transmit the presence information, e.g., via the registration path 114 or the signaling path 116. Other computing devices 102 or 104, or core network device(s) 108 (individually or collectively referred to for brevity as "watchers") can indicate a desire to receive presence information by transmitting a SIP SUBSCRIBE request to information server 120. Information server 120 can forward received presence information to the watchers, e.g., via SIP NOTIFY requests. Information server 120 can be configured to store presence-information records including information of functional characteristics.

When computing device 104 powers up or connects to the access network 112, computing device 104 can transmit presence information, e.g., via registration path 114. The presence information can include or be included in a SIP NOTIFY request. Note that some network architectures require that a registration, e.g., a SIP REGISTER request, be successfully processed, so that computing device 104 is authenticated to information server 120, before the SIP NOTIFY can be successfully processed. This registration is omitted from FIG. 1 for brevity. In some examples, the presence information can include an indication of functional characteristics 122 associated with the computing device 104. For example, the functional characteristics 122 can indicate the access-network type, available bit rates, or other information such as that described above with reference to presence information.

As used herein, a message "transmitted to" or "transmitted toward" a destination, or similar terms, can be transmitted directly to the destination, or can be transmitted via one or more intermediate network devices to the destination. In the illustrated example, computing device 104 transmits functional characteristics 122 to information server 120 via access network 112. Similarly, a message "received from" a destination can be received directly from the destination, or can be received via one or more intermediate network devices from the destination. In the illustrated example, information server 120 receives functional characteristics 122 from computing device 104 via access network 112. A message passing through one or more intermediate network devices can be modified by those network devices, e.g., by adding or removing framing, or by changing a presentation of at least part of the message, e.g., from a SIP start-line to a SIP header or vice versa.

The remainder of the discussion of FIG. 1 is presented in the context of interactions between computing devices 102 and 104. However, throughout the remainder of the discussion of FIG. 1, functions described with reference to computing device 102 can additionally or alternatively be performed by core network device 108, unless otherwise specified in this document.

In some examples, computing device 102 can transmit a subscription request 124, e.g., a SIP SUBSCRIBE request, to information server 120. Computing device 102 can be an example of a watcher. In response, information server 120 can notify computing device 102 or core network device 108 when particular events occur, those events being defined within an "event package." In some examples, computing device 104 can transmit a publication message, e.g., a SIP PUBLISH request, to information server 120. The publication message can convey information about a state of computing device 104, e.g., with respect to events defined in an event package. A publication message, for example, can convey presence information or other information relating to, e.g., presence, handset capabilities, supported codecs, or handset location. In response to a publication message, information server 120 can convey updated information to watchers, e.g., computing device 102, by sending notification messages, e.g., SIP NOTIFY requests, to those devices. For example, an event defined in a presence event package can include receipt by the information server 120 of a SIP PUBLISH from computing device 104 that includes updated information of functional characteristics 122. Using the SUBSCRIBE/PUBLISH/NOTIFY model, e.g., as in SIP, can permit computing device 102 to pull, or receive via push notifications such as a SIP NOTIFY request, information of functional characteristics 122.

Based on functional characteristics 122 received from information server 120, computing device 102 can perform request processing 126, e.g., as described below in more detail with reference to FIGS. 2-5. For example, computing device 102 can determine that the functional characteristics 122 do not satisfy a functional specification associated with a session to be established with the computing device 104. In response, the computing device can determine an altered functional specification and initiate an altered session with the computing device 104 based at least in part on the altered functional specification. As noted above, an altered session is supported by the least capable of the access networks carrying data of the session.

For example, a user of computing device 102 may request a real-time RCS chat session be established to computing device 104. Computing device 102 can receive the request, e.g., via a "Send" control 128 of a user interface. Computing device 102 can determine, based on functional characteristics 122, that computing device 104 does not support RCS chat, but does support SMS. Computing device 102 can then transmit an initiation request 130 of an SMS communication session, e.g., a SIP INVITE or a mobile originating forward short message (MO FSM), via, e.g., signaling path 116. (In connectionless applications such as SMS, each SMS message can be an initiation request 130, or the first SMS message of a sequence of messages between a particular pair of terminals can be the initiation request 130.) The altered SMS session can be initiated transparently to the user of computing device 102. Computing device 102 can transparently present SMS messages to the user as RCS chat messages.

The computing device 102 in this example is a session-originating device, i.e., a computing device initiating a communication session with another computing device. Session-originating devices can include user equipment or other telecommunications or computing devices communicatively connectable with other computing devices via one or more core network device(s) 108. Mobile phones and copper-loop landline phones can be examples of session-originating devices.

Call initiation can be performed, e.g., as defined in the GSM or VoLTE standards, and can include the exchange of additional messages (not shown) between the computing devices 104 and 102 and the core network device(s) 108. For example, the user of computing device 104 can operate a call-acceptance control 132 such as a touchscreen button. Computing device 104 can then transmit a SIP 200 OK response to a SIP INVITE message. Once the session is established, data of the session, such as audio data or video data, can be exchanged between computing devices 104 and 102 via a communications channel depicted as media path 118. As shown, media path 118 can pass through core network device(s) 108 or can bypass core network device(s) 108.

Figure 2:
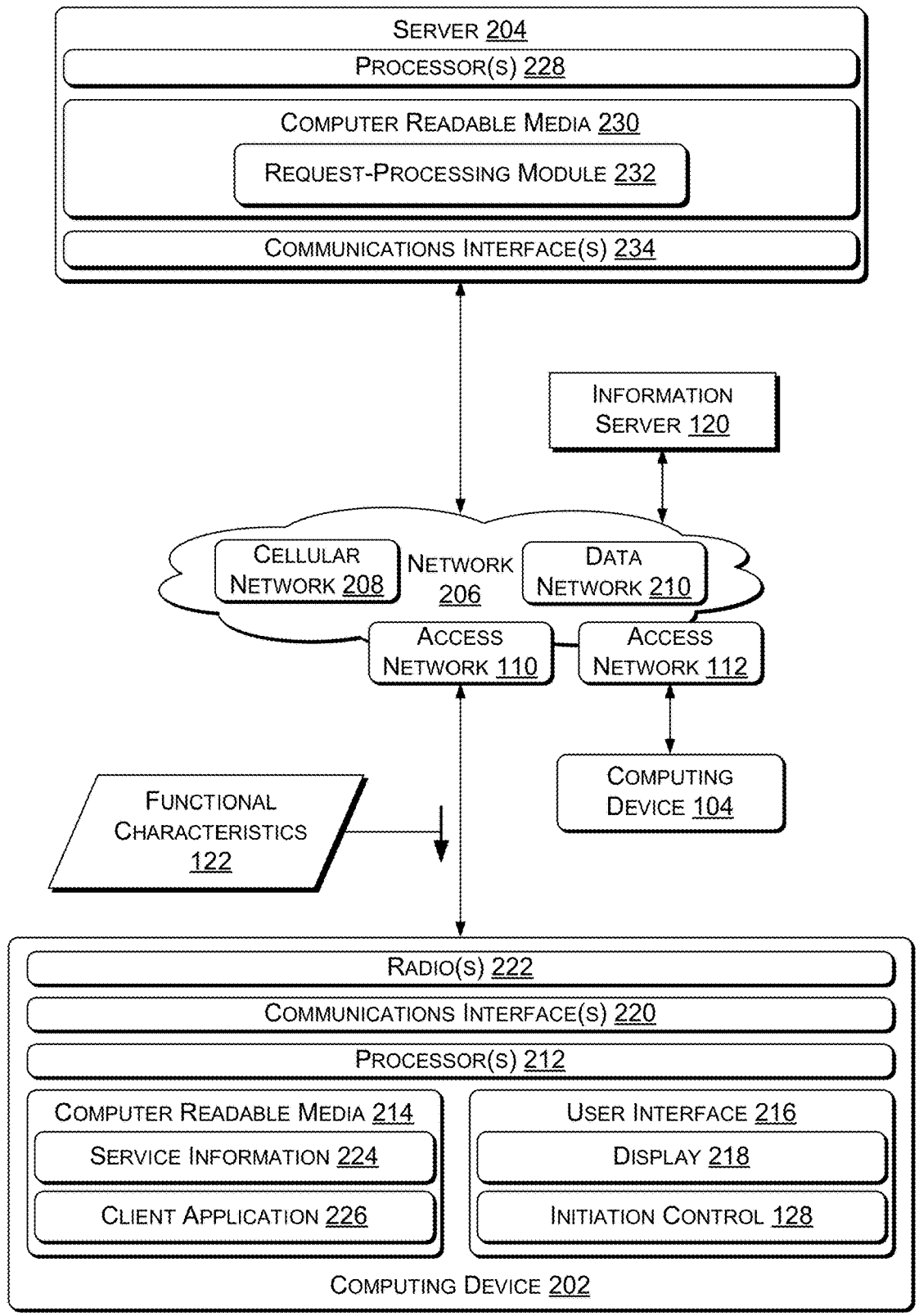
FIG. 2 is a block diagram illustrating components of a telecommunication system according to some implementations.

FIG. 2 is a block diagram illustrating a system 200, e.g., a telecommunication system, permitting altering according to some implementations. The system 200 includes a computing device 202, e.g., a wireless phone or other user equipment, which can represent computing device 102 or 104, FIG. 1. Computing device 202 can be coupled to a server 204 via a telecommunications network 206, which can represent network 106, FIG. 1. The server 204 can be an example of the core network device(s) 108 or the information server 120, FIG. 1, e.g., a presence server, S-CSCF, RMS, TAS, or other AS.

For clarity of explanation, computing device 202 will be discussed in the context of a calling terminal, server 204 will be discussed in the context of a core network device 108, and information server 120 will be discussed separately from server 204. However, this is not limiting. Except as expressly described herein, components described with reference to computing device 202 or server 204 can be used in implementing a called terminal, a calling terminal, or an information server 120.

The network 206 can include one or more networks, such as a cellular network 208 and a data network 210. The network 206 can include one or more core network(s) connected to terminals, e.g., computing device 104, via one or more access network(s) 110, 112.

The cellular network 208 can provide wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), VoIP, VoLTE, IEEE 802.1* protocols such as 802.11 or 802.15, wireless microwave access (WIMAX), WIFI, and/or any future IP-based network technology or evolution of an existing IP-based network technology. Communications between the server 204 and computing devices such as the computing device 202 can additionally or alternatively be performed using other technologies, such as wired (Plain Old Telephone Service, POTS, or PSTN lines), optical (e.g., Synchronous Optical NETwork, SONET) technologies, and the like.

The data network 210 can include various types of networks for transmitting and receiving data (e.g., data packets), including networks using technologies such as WIFI, IEEE 802.15.1 (BLUETOOTH), Asynchronous Transfer Mode (ATM), WIMAX, and other network technologies, e.g., configured to transport Internet Protocol (IP) packets. In some examples, the server 204 includes or is communicatively connected with an interworking function (IWF) or other device bridging networks, e.g., LTE, 3G, and POTS networks. In some examples, the server 204 can bridge SS7 traffic from the PSTN into the network 206, e.g., permitting PSTN customers to place calls to cellular customers and vice versa.

In some examples, the cellular network 208 and the data network 210 can carry voice or data. For example, the data network 210 can carry voice traffic using Voice over Internet Protocol (VoW) or other technologies as well as data traffic, or the cellular network 208 can carry data packets using High Speed Packet Access (HSPA), LTE, or other technologies as well as voice traffic. Some cellular networks 208 carry both data and voice in a packet-switched format. For example, many LTE networks carry voice traffic in data packets according to the voice-over-LTE (VoLTE) standard. Some LTE networks can interconnect with WIFI access networks to permit IMS-mediated voice-over-WIFI (Vo-WIFI) calling. Various examples herein provide origination and termination of, e.g., carrier-grade voice calls on, e.g., circuit-switched (CS) networks or mixed VoLTE/3G networks, and on computing devices 202 including original equipment manufacturer (OEM) handsets, non-OEM handsets, or computing devices running over-the-top (OTT) SIP client software.

The computing device 202 can be or include a wireless phone, a wired phone, a tablet computer, a laptop computer, a wristwatch, or other type of computing device. The computing device 202 can include at least one processor 212, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media 214, such as memory (e.g., random access memory (RAM), solid state drives (SSDs), or the like), disk drives (e.g., platter-based hard drives), another type of computer-readable media, or any combination thereof.

The computing device 202 can further include a user interface (UI) 216, e.g., including an electronic display device 218, a speaker, a vibration unit, a touchscreen, or other devices for presenting information to a user or receiving commands from the user. The user interface 216 can include a session-initiating user interface control 128, e.g., a touchscreen button, to indicate a communication session should be initiated. The user interface 216 or components thereof, e.g., the electronic display device 218, can be separate from the computing device 202 or integrated (e.g., as illustrated in FIG. 1) with the computing device 202.

The computing device 202 can further include one or more communications interface(s) 220 configured to selectively communicate via the network 206. For example, communications interface(s) 220 can operate one or more radio(s) 222 of computing device 202 to communicate via network 206. Radio(s) 222 can, e.g., communicate via access network(s) 110 or 112 of cellular network 208. Communications interface(s) 220 can additionally or alternatively include one or more transceivers or other components configured to communicate using wired connections via the network 206. In some examples, communications interface(s) 220, or an individual communications interface 220, can include or be communicatively connected with transceivers or radio units for multiple types of access networks, e.g., at least two of 2G, 3G, LTE, or WIFI.

The computer readable media 214 can be used to store data and to store components that are operable by the processor 212 or instructions that are executable by the processor 212 to perform various functions as described herein. The computer readable media 214 can store various types of instructions and data, such as an operating system, device drivers, etc. Stored processor-executable instructions can be arranged in modules or components. Stored processor-executable instructions can be executed by the processor 212 to perform the various functions described herein.

The computer readable media 214 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processor 212. Tangible computer-readable media can include volatile and nonvolatile, removable and non-removable media implemented in any method or technology for storage of information, such as computer readable instructions, data structures, program modules, or other data.

The computer readable media 214 can store service information 224 indicating information of the computing device 202, a user thereof, or at least one network service the computing device 202 is configured to use. The service information 224 can include, e.g., indications of application servers or service types to which the computing device 202 may attempt to connect.

The computer readable media 214 can include processor-executable instructions of a client application 226 or other modules or components. The client application 226, e.g., a native or other dialer, can permit a user to originate and terminate communication sessions associated with the computing device 202, e.g., a wireless phone. In some examples, the client application 226 can cause computing device 202 to request or receive the functional characteristics 122, or to transmit a registration or subscription request, or the initiation request 130, to the server 204 or another network-connected device. The client application 226 can determine at least some of the contents of initiation request 130 based at least in part on the functional characteristics 122 or the service information 224. In some example, the processor-executable instructions of the client application 226 can be executed by the processor 212 to perform various functions described herein, e.g., with reference to at least one of FIG. 1-5, 9, or 10. For example, client application 226 can represent or perform request processing 126, FIG. 1.

The server 204 can include at least one processor 228 and one or more computer readable media (CRM) 230. The computer readable media 230 can be used to store processor-executable instructions of a request-processing module 232 or other modules or components. Request-processing module 232 can represent or perform request processing 126, FIG. 1. The processor-executable instructions can be executed by the processor 228 to perform various functions described herein, e.g., with reference to at least one of FIG. 1, 2, or 6-8.

The server 204 can include one or more communications interface(s) 234, e.g., of any of the types described above with reference to communications interface(s) 220. For example, server 204 can communicate via communications interface(s) 234 with information server 120 or with other core network devices 108.

Figure 3:
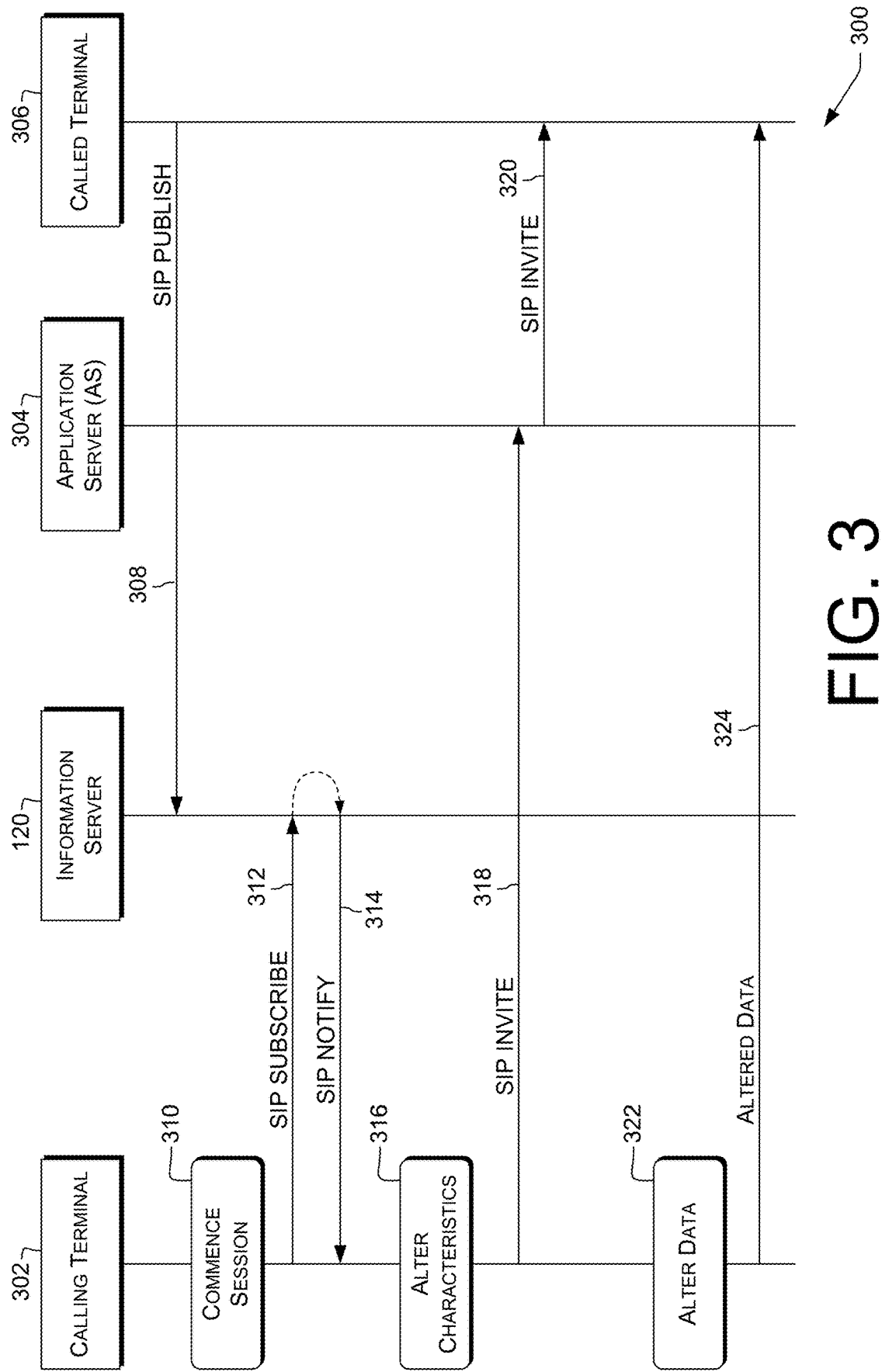
FIG. 3 shows a call flow illustrating an example session-altering process implemented at a calling terminal according to some implementations.

FIG. 3 shows a call flow 300 illustrating an example altering process implemented at a calling terminal 302, which can represent computing device 102 or 202, e.g., a VoLTE or VoWIFI UE. Calling terminal 302, in this example, is communicatively connectable with information server 120, an application server (AS) 304, and a called terminal 306. Calling terminal 302 can represent, e.g., computing device 102 or 202. Called terminal 306 can represent, e.g., computing device 104 or 202.

Figure 6:
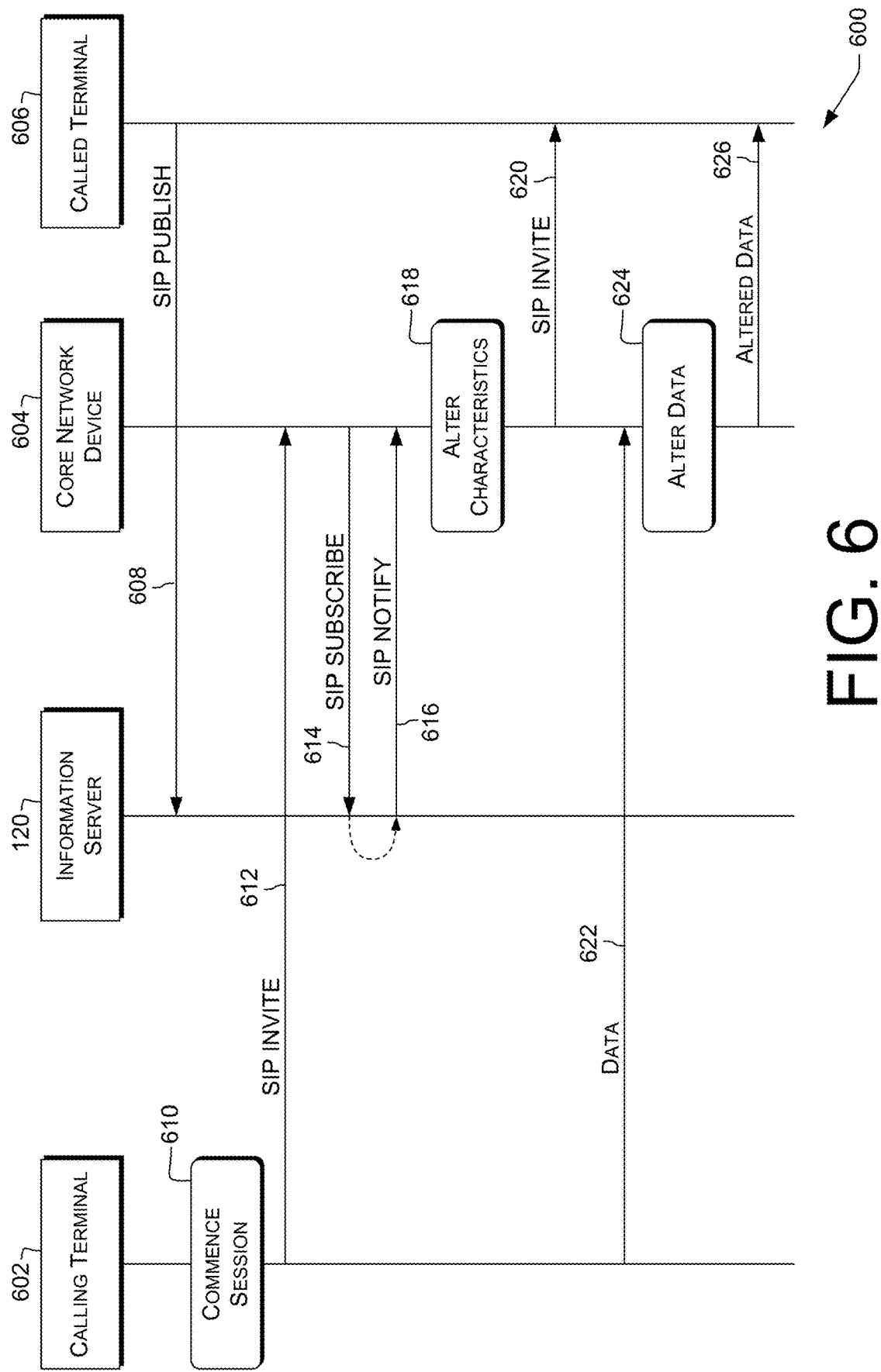
FIG. 6 shows a call flow illustrating an example session-altering process implemented at a core network device according to some implementations.

In FIG. 3, and also in the call flow of FIG. 6, other core network devices 108, e.g., a proxy call session control function (P-CSCF) or S-CSCF, may be present, but are omitted for brevity. Also, in the call flows herein, some SIP responses are omitted, and other SIP requests and responses may be omitted, for brevity.

As shown, in advance of a communication session, called terminal 306 can send an indication of functional characteristics associated with called terminal 306 to information server 120. In the illustrated example, the called terminal 306 conveys the indication via a SIP PUBLISH message 308. For example, the indication can be included in presence information, and information server 120 can be or include a presence server.

At block 310, calling terminal 302 can commence processing related to a session. For example, block 310 can include receiving an indication that "Send" control 128 has been activated, or that the user of calling terminal 302 wishes to communicate with called terminal 306.

At or after block 310, calling terminal 302 can retrieve, from information server 120, an indication of functional characteristics associated with called terminal 306. In the illustrated example, calling terminal 302 transmits a SIP SUBSCRIBE request, shown as message 312, to information server 120. Information server 120 then processes the subscription of message 312. In response to, or subsequent to, successful subscription processing, information server 120 sends a SIP NOTIFY request, shown as message 314, to calling terminal 302. The SIP NOTIFY request can include the indication of the functional characteristics. In some examples, the information server 120 reports all of the performance-characteristic information received from called terminal 306. In other examples, the information server 120 reports less than all of the performance-characteristic information received from called terminal 306.

At block 316, calling terminal 302 can determine that the functional characteristics do not satisfy a functional specification associated with the session to be established with the called terminal 306. The functional specification can correspond to, e.g., minimal or preferred requirements for the session to be conducted.

For example, as discussed above, the user may have requested an RCS session, but called access network 112 may not support RCS. In other examples, the functional specification can indicate that RCS is required, that sufficient bandwidth for CIF video is required, and that sufficient bandwidth for 720p video is preferred. Block 316 can include determining that the functional characteristics do not satisfy the functional specification if RCS is not available or if available bandwidth is less than that required for CIF. In some examples, block 316 can include, e.g., at user option or based on a preference setting, determining that the functional characteristics do not satisfy the functional specification if the preferred bandwidth (for 720p video) is not available.

In response to a determination that the functional characteristics do not specify the functional specification, at block 316, calling terminal 302 can determine an altered functional specification based at least in part on the functional characteristics and the functional specification, so that the functional characteristics satisfy the altered functional specification. Examples of altering are discussed herein with reference to blocks 410, 414, 618, 706, or 710. For example, if specific desired capabilities (e.g., RCS) are absent from presence information conveying the functional characteristics, calling terminal 302 can determine that an alternative such as SMS or MMS should be used.

At or after block 316, calling terminal 302 can initiate an altered session with called terminal 306 via the network 106 based at least in part on the altered functional specification. For example, calling terminal 302 can transmit a SIP INVITE request, shown as message 318, to AS 304. In the illustrated example, AS 304 proxies the INVITE to called terminal 306 as message 320. Message 318 can include a Session Description Protocol (SDP) body requesting a session having the altered functional specification. In other examples, omitted for brevity, message 318 can additionally or alternatively be or include an SMS or other connectionless message.

At block 322, in some examples, during the session, calling terminal 302 can determine altered data based at least in part on data of the session and on the altered functional specification. For example, the session can include a video call. At block 322, the calling terminal 302 can receive or capture high-resolution video of the video call, e.g., 720p or 1080p video. Calling terminal 302 can then downsample the video to provide the altered data of the session, e.g., 480p or Common Intermediate Format (CIF) video. Calling terminal 302 can then transmit the altered data to the called terminal 306 via the network 106 within the altered session. This transmission is shown as message 324.

In some examples, called terminal 306 or a terminating-side core network device such as a terminating TAS or SMSC can detect a failure in the transmission of message 324 including the altered data. The terminating-side device that detects the failure can then trigger a retry, e.g., by sending an error message or retry request to calling terminal 302.

Illustrative Processes

Figure 4:
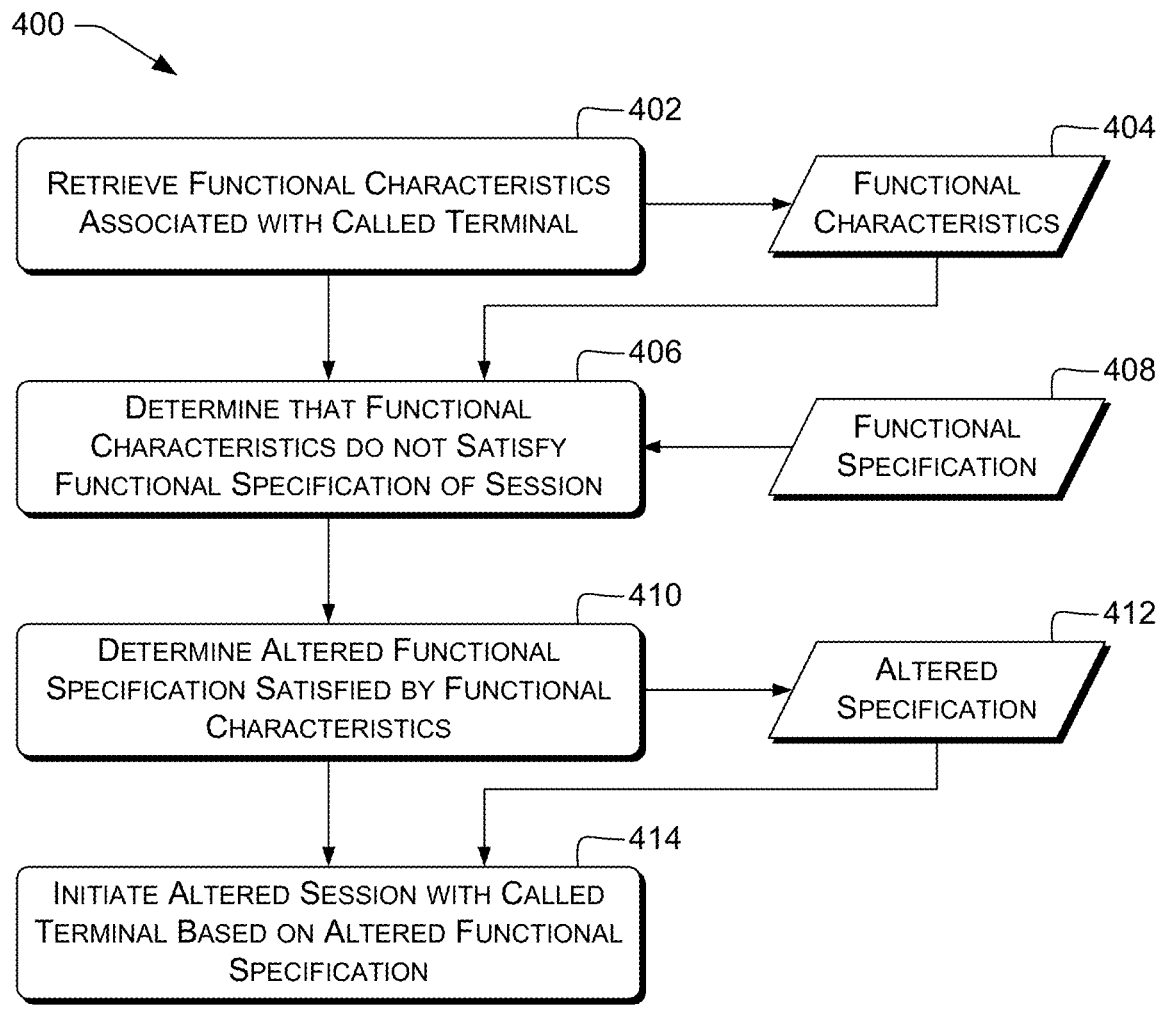
FIG. 4 is a dataflow diagram illustrating an example process for altering a session at a calling terminal according to some implementations.

FIG. 4 illustrates an example process 400 for altering a session at a calling terminal 302, e.g., computing device 102 or 202, and associated data items. In some examples, the calling terminal 302 includes one or more processors 212 configured to perform operations described below, e.g., in response to computer program instructions of the client application 226.

Operations shown in FIG. 4, 5, or 7-10 can be performed in any order except when otherwise specified, or when data from an earlier step is used in a later step. Any operation shown in multiple figures can be as discussed with reference to the first figure in which that operation is shown. In some of these and other examples, calling terminal 302 can alter a session, e.g., transparently to the user of calling terminal 302. This can permit communicating with called terminal 306 via a wider range of types of access network 112.

For clarity of explanation, reference is made in the discussion of the flowcharts to various components shown in FIGS. 1 and 2, and messages shown in FIGS. 3 and 6, that can carry out or participate in the steps or operations of the exemplary method. It should be noted, however, that other components can be used; that is, exemplary method(s) shown in FIG. 4, 5, or 7-10 are not limited to being carried out by the identified components or using the identified messages.

At 402, calling terminal 302 can retrieve, from an information server 120 via the network 106, an indication of functional characteristics 404 associated with a called terminal. Examples are discussed herein, e.g., with reference to block 310 and messages 312 and 314. In some examples, the functional characteristics 404 can be conveyed using various formats, e.g., vCard, Presence Information Data Format (PIDF) (RFC 3863), SDP, or other formats, such as formats based on Extensible Markup Language (XML), JAVASCRIPT Object Notation (JSON), or YAML.

At 406, calling terminal 302 can determine that the functional characteristics 404 do not satisfy a functional specification 408 associated with a session to be established with the called terminal 306. Examples are discussed herein, e.g., with reference to block 316.

In some examples, the functional characteristics 404 can indicate that the called terminal 306 is connected to a cellular network. The performance of a cellular network can vary over time as the called terminal 306 moves within the service area of a particular base station, between base-station coverage areas, or between different operators' networks. In some examples, the functional characteristics 404 can include information useful for restricting data transmissions when the called terminal 306 is on a less capable or more expensive cellular network. For example, the functional characteristics 404 can indicate that the called terminal is roaming in the cellular network; the cellular network is a premium network with respect to the called terminal (e.g., a network without an unlimited-data plan); or the cellular network is of a generation less than the fourth generation (4G).

At 410, calling terminal 302 can determine an altered functional specification 412 ("altered specification") based at least in part on the functional characteristics 404 and the functional specification 408. The calling terminal 302 can determine the altered functional specification 412 so that the functional characteristics 404 satisfy the altered functional specification 412. Examples are discussed herein, e.g., with reference to block 316. In some examples, the functional specification 408 indicates a Rich Communication Services (RCS) session and the altered functional specification 412 indicates a Multimedia Messaging Service (MMS) or Short Messaging Service (SMS) session. Additionally or alternatively, the altered functional specification 412 can indicate an RCS session using alternative RCS techniques or using only a limited bandwidth (bps) or a limited size (bits). For example, a 10 MB RCS file transfer, e.g., of an image or a video, can be altered to an RCS Large Message Mode (LMM) message that is, e.g., 1 MB in size.

In some examples, the functional specification 408 relates to bit rate of content to be transferred in the session. For example, the functional specification 408 can indicate a first bit rate for a video and the altered functional specification 412 can indicate a second, lower bit rate for an altered video. In some examples, the second bit rate can be at most 40% of the first bit rate. However, this is merely one nonlimiting example. In some examples, the second bit rate can be at most a predetermined percentage of the first bit rate. The predetermined percentage can be determined based at least in part on at least one of: the functional characteristics 404 associated with the called terminal, or functional characteristics associated with the calling terminal.

At 414, calling terminal 302 can initiate an altered session with the called terminal 306 via the network 106 based at least in part on the altered functional specification 412. Examples are discussed herein, e.g., with reference to message 318.

Figure 5:
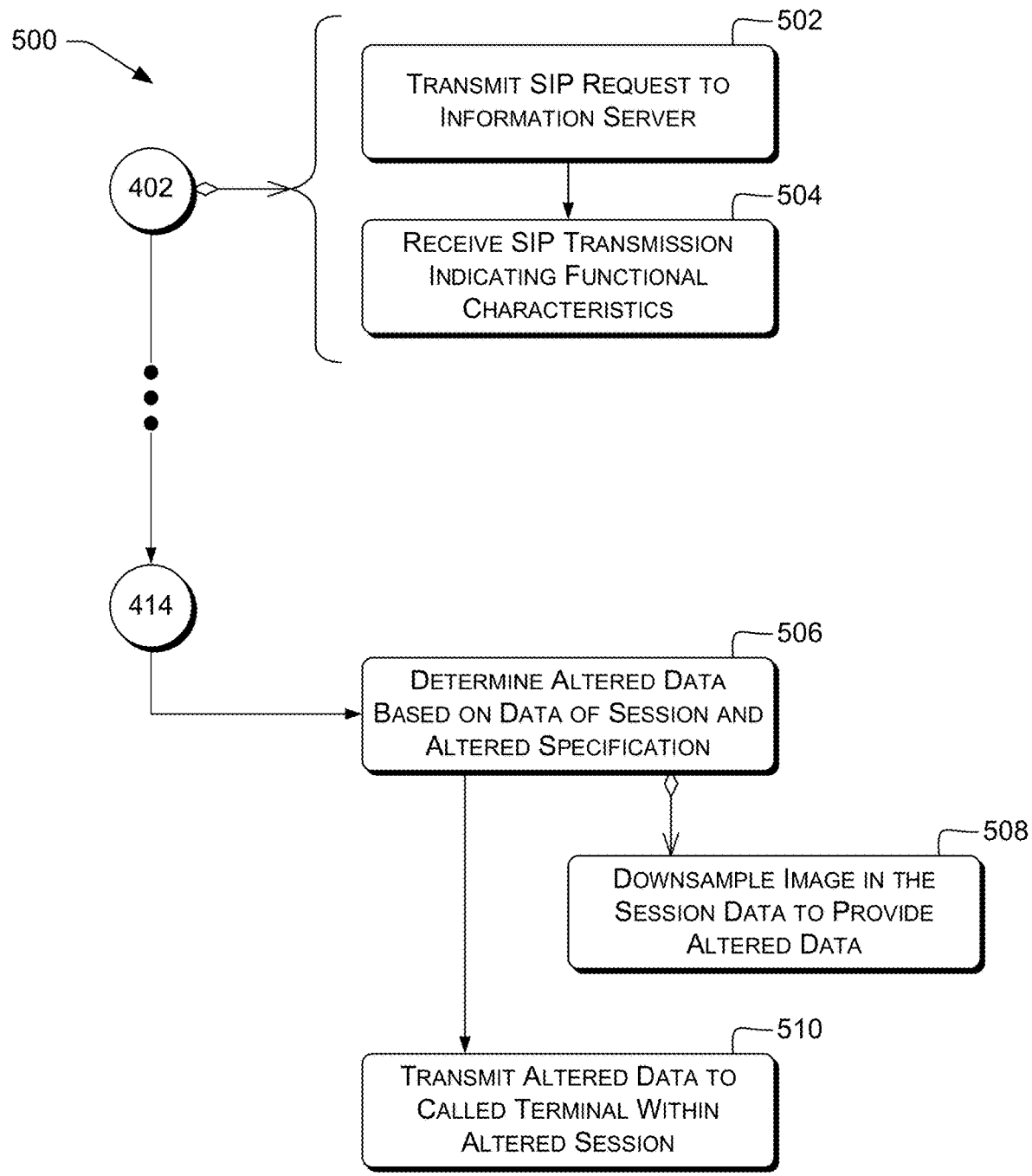
FIG. 5 shows an example process for altering a session, e.g., data of a session, at a calling terminal according to some implementations.

FIG. 5 illustrates an example process 500 for altering a session at a calling terminal 302. In some examples, block 402 can include blocks 502 and 504. In some examples, block 414 can be followed by blocks 506, 508, or 510.

At 502, calling terminal 302 can transmit a SIP request to information server 120, e.g., a presence server. Examples are discussed herein, e.g., with reference to message 312. For example, the SIP request can be a SIP SUBSCRIBE or SIP OPTIONS request. In some examples, a SIP OPTIONS request can be used by a terminal that does not wish to become a watcher. This can alter the amount of network capacity used by the exchange of presence information, e.g., for a call to an infrequently-dialed number.

At 504, calling terminal 302 can receive a SIP transmission from information server 120. For example, the SIP transmission can include a SIP 200 OK response to a SUBSCRIBE or OPTIONS request, e.g., carrying a message body. Additionally or alternatively, the SIP transmission can include a SIP NOTIFY request. Examples are discussed herein, e.g., with reference to message 314. In some examples using block 504 and in some other examples, the SIP transmission can include the indication of the functional characteristics 404 associated with the called terminal 306, e.g., in at least one header or at least one message body, such as an SDP body.

At 506, e.g., after establishing a session, calling terminal 302 can determine altered data based at least in part on data of the session and on the altered functional specification 412. For example, calling terminal 302 can determine SMS data in place of RCS text data, or can determine lower-resolution image, video, or audio content. Calling terminal 302 can additionally or alternatively perform other techniques for determining altered data as described herein. Examples are discussed herein, e.g., with reference to block 322. In some examples, block 506 can include block 508.

In some examples, calling terminal 302 can notify a user of calling terminal 302 that the user's original message (e.g., the data of the session) cannot be sent, and that the altered data are being sent instead. This can permit the user to choose whether to try again at a later time. For example, calling terminal 302 can present a toast or notification such as "this RCS message is being sent via MIMS" or "this image (video) is being downsampled for transmission."

At 508, calling terminal 302 can downsample at least one image in the data of the session to provide at least part of the altered data. The image can be, e.g., a still image such as a camera photo, or a frame of video. Calling terminal 302 can downsample, e.g., by with or without filtering or resampling.

At 510, calling terminal 302 can transmit the altered data to the called terminal 306 via the network 106 within the altered session. Examples are discussed herein, e.g., with reference to message 324.

FIG. 6 shows a call flow 600 illustrating an example altering process of a session from a calling terminal 602, which can represent computing device 102 or 202. In the illustrated example, altering is implemented at a core network device 604, e.g., core network device 108 or server 204. In some examples, the core network device 604 is a Rich Communication Services (RCS) Messaging Server (RMS) or other AS. The core network device 604 mediates the session between the calling terminal 602 and a called terminal 606, which can represent called terminal 306. For example, the core network device 604 can control the file sizes, bandwidths, communications channels, or session types or options permitted between the calling terminal 602 and the called terminal 606.

In some examples, before the session begins, called terminal 606 can report functional characteristics 404 associated with the called terminal 606 to information server 120, e.g., a presence server. This is shown as message 608, e.g., a SIP PUBLISH. Examples are discussed herein, e.g., with reference to message 308.

At 610, calling terminal 602 can begin session processing. For example, calling terminal 602 can prepare and send an invitation message 612, shown as a SIP INVITE, to core network device 604. In some examples, invitation message 612 can include an SDP body or other information requesting a full-bandwidth or full-featured communication session, e.g., RMS chat or high-definition (HD) video streaming.

In response to invitation message 612, core network device 604 can retrieve or otherwise determine functional characteristics 404 associated with the called terminal 606. In the illustrated example, the core network device 604 sends a message 614 to information server 120, e.g., a SIP SUBSCRIBE message. In response, information server 120 provides a message 616, e.g., a SIP NOTIFY, indicating the functional characteristics 404. Examples are discussed herein, e.g., with reference to messages 312 and 314.

At 618, core network device 604 can determine an altered functional specification 412 that the functional characteristics 404 do satisfy. The core network device 604 then transmits a second invitation message 620 associated with the altered functional specification 412. In some examples, the second invitation message 620 is a modified version of the invitation message 612. The pre-establishment phase can then continue with SIP 200 OK responses and other transmissions as usual.

Block 618 shows an example of modifying a session the called terminal 606 cannot adequately process. Additionally or alternatively, core network device 604 can reject such sessions, e.g., by sending a SIP error response such as a SIP 403 Forbidden response to the calling terminal 602.

Throughout a session, core network device 604 can rewrite headers or bodies of transmissions to permit the higher-performance calling terminal 602 to communicate with the lower-performance called terminal 606 (performance can be limited by the terminals themselves or by the access networks, as discussed above). For example, calling terminal 602 can provide a message 622 including data of the session.

At 624, core network device 604 can determine altered data based on message 622 and on the altered functional specification 412. Core network device 604 can then transmit the altered data to called terminal 606 in a message 626.

Figure 7:
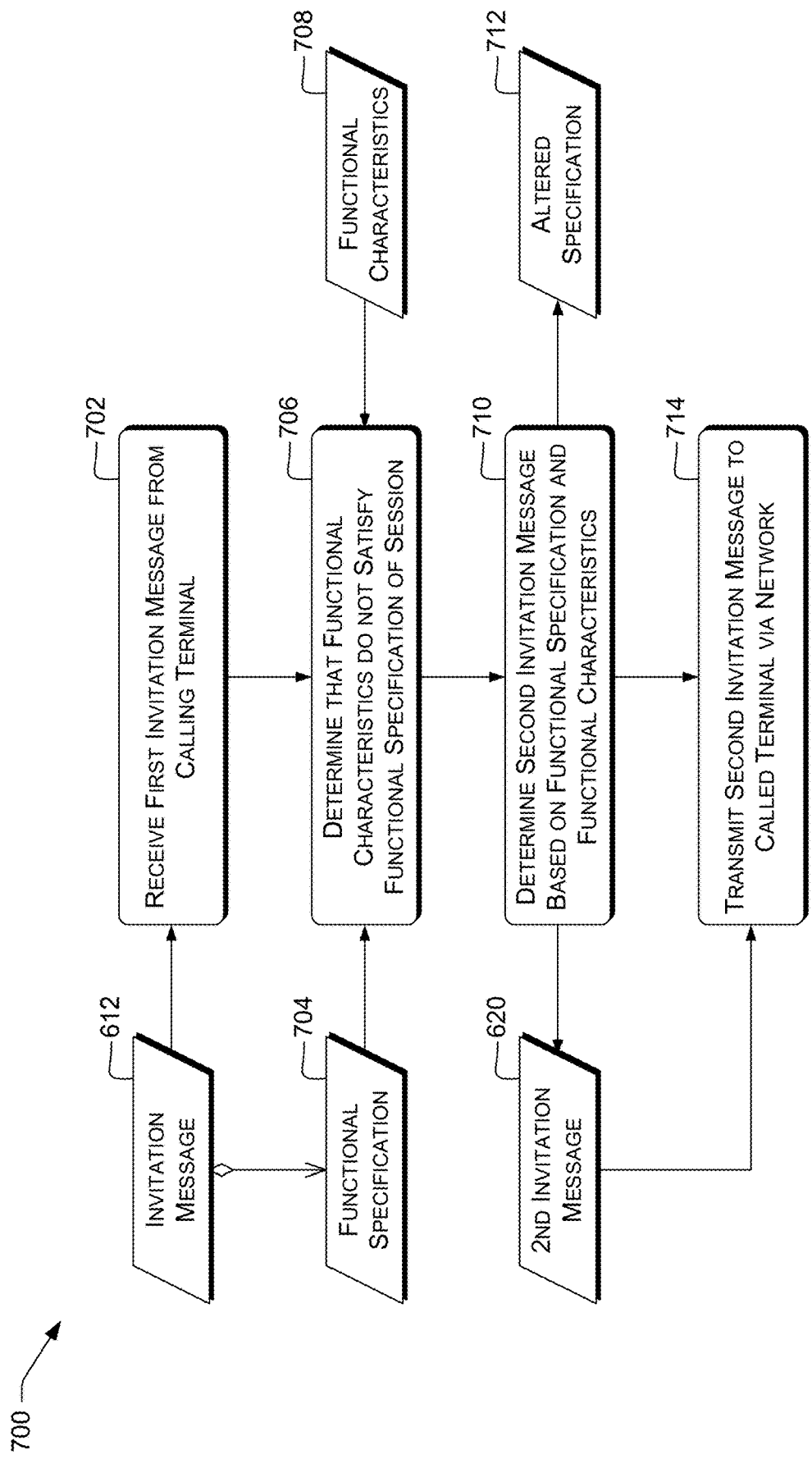
FIG. 7 is a dataflow diagram illustrating an example process for altering a session at a core network device according to some implementations.

FIG. 7 illustrates an example process 700 for altering a session at a core network device 604, e.g., core network device 108 or server 204, and associated data items. In some examples, the core network device 604 includes one or more processors 228 configured to perform operations described below, e.g., in response to computer program instructions of the request-processing module 232.

At 702, core network device 604 can receive, via a network 106, a first invitation message 612 from a calling terminal 602. The first invitation message 612 identifies a called terminal 606 and is associated with a functional specification 704. In the illustrated example, the first invitation message 612 includes the functional specification 704 or an indication thereof, e.g., in an SDP body. In some examples, the first invitation message 612 includes a reference to the functional specification 704, e.g., a database key, service name, or Domain Name System (DNS) SRV record name. Examples are discussed herein, e.g., with reference to invitation message 612.

At 706, core network device 604 can determine that the functional characteristics 708 associated with the called terminal 606 do not satisfy the functional specification 704. Examples are discussed herein, e.g., with reference to blocks 406 or 618.

At 710, core network device 604 can determine a second invitation message 620 based at least in part on the functional characteristics 708 and the functional specification 704. In some examples, at block 710, core network device 604 can determine an altered functional specification 712 satisfied by the functional characteristics 708. The second invitation message 620 can be associated with the altered functional specification 712. Examples are discussed herein, e.g., with reference to block 618 or message 620.

At 714, core network device 604 can transmit the second invitation message 620 via the network 106 to the called terminal 606.

Figure 8:
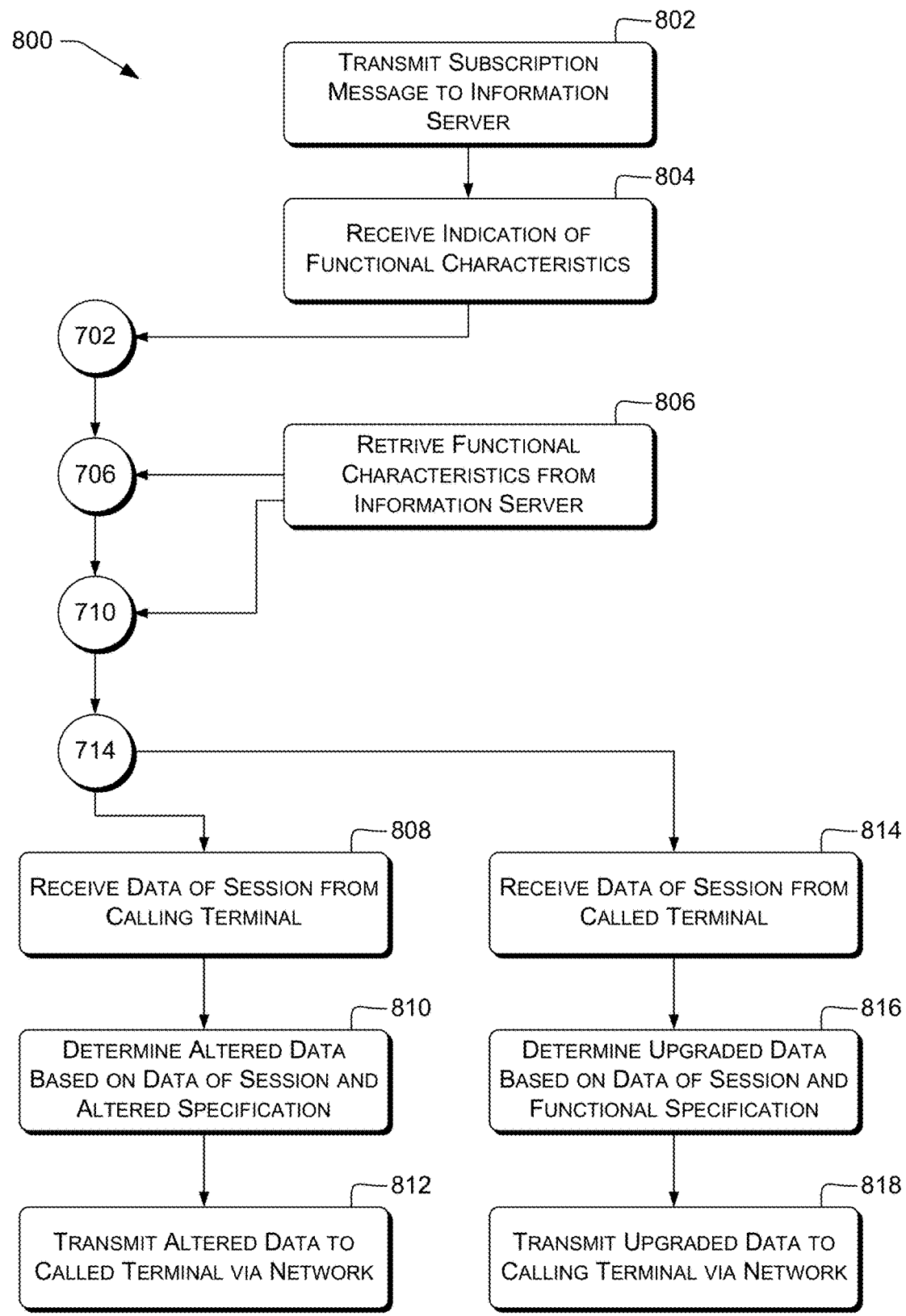
FIG. 8 shows an example process for altering a session, e.g., data of a session, at a core network device according to some implementations.

FIG. 8 illustrates an example process 800 for altering a session at a core network device 604. In some examples, block 702 can be preceded by blocks 802 and 804. In some examples, blocks 706 or 710 can be preceded by block 806. In some examples, block 714 can be followed by blocks 808, 810, and 812, or by blocks 814, 816, and 818.

At 802, before receiving the first invitation message at block 702, core network device 604 can transmit a subscription message to an information server 120 via the network 106. The subscription message is associated with the called terminal 606. For example, the subscription message can identify called terminal 606, e.g., by an identifier thereof, or by a wildcard matching that identifier. In some examples, core network device 604 is an AS to which called terminal 606 registers, e.g., a TAS. While processing the registration of called terminal 606, core network device 604 can transmit the subscription message.

At 804, core network device 604 can receive, from the information server 120 and via the network 106, an indication of the functional characteristics 708 associated with the called terminal 606. This can permit core network device 604 to access up-to-date state information regarding the functional characteristics 708, which can alter call-setup latency. Block 804 can be followed by block 702.

At 806, e.g., before testing the functional characteristics at block 706 or determining the second invitation message at block 710, core network device 604 can retrieve, via network 106 and from information server 120, an indication of the functional characteristics 708 associated with the called terminal 606. This can permit using functional characteristics 708 with altered state compared to examples involving advance subscriptions. Examples are discussed herein, e.g., with reference to messages 614 (SUBSCRIBE) and 616 (NOTIFY). In some examples, other protocols than SUBSCRIBE/NOTIFY can be used. For example, at block 806, core network device 604 can transmit a SIP MESSAGE request including a header or body requesting the information server 120 provide the functional characteristics 708.

Information server 120 can then provide the functional characteristics 708 in a SIP 200 OK or other SIP response to the core network device 604. Block 806 can be followed by blocks 706 or 710.

At 808, after transmitting the second invitation message at block 714, e.g., after a communication session associated with second invitation message 620 has been established, core network device 604 can receive data of a communication session from the calling terminal 602 via the network 106. Examples are discussed herein, e.g., with reference to message 622.

At 810, core network device 604 can determine altered data based at least in part on the data of the communication session and on the altered functional specification 712. Examples are discussed herein, e.g., with reference to block 624.

In some examples, at 810, core network device 604 can store the data of the session, as received at block 808. For example, core network device 604 can provide a store-and-forward service. Core network device 604 can detect when called terminal 606 is capable of receiving the data of the session, e.g., in response to a change in presence information such as that described herein with reference to blocks 912 and 914. In response to the detection, core network device 604 can transmit the stored data to the called terminal 606.

At 812, core network device 604 can transmit the altered data to the called terminal 606 via the network 106. Examples are discussed herein, e.g., with reference to message 626. In some examples, at block 810 or 812, core network device 604 can notify the calling terminal 602 that the data were altered; however, this is not required.

In some examples, operations similar to those in blocks 808, 810, and 812 can be used in reverse for data transmissions from the called terminal 606 to the calling terminal 602. Some such examples use blocks 814, 816, and 818.

At 814, core network device 604 can receive data of the communication session from the called terminal 606 via the network 106.

At 816, core network device 604 can determine upgraded data based at least in part on the data of the communication session and on the functional specification 704. "Upgrading" and similar terms, as used herein, can include operations that reverse altering operations such as those described herein. For example, core network device 604 can copy the text content of SMS messages into RCS text messages; can upsample images such as still images or frames of video; or can otherwise prepare data for transmission to the calling terminal 602.

At 818, core network device 604 can transmit the upgraded data to the calling terminal 602. This can provide seamless interoperability between called terminal 606 and calling terminal 602.

Figure 9:
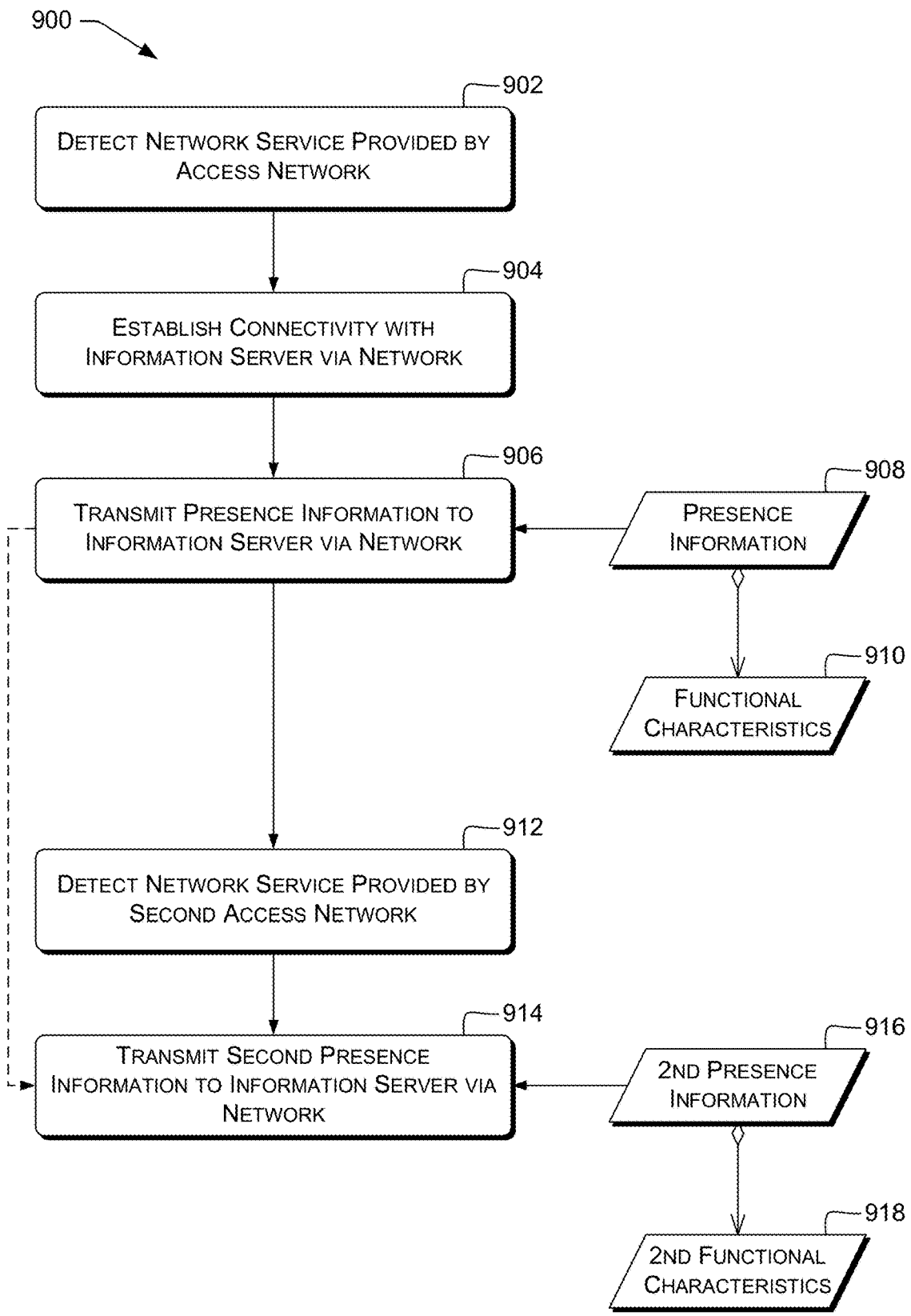
FIG. 9 is a dataflow diagram illustrating an example process for reporting functional characteristics, e.g., related to an access network, at a called terminal according to some implementations.

FIG. 9 illustrates an example process 900 for reporting functional characteristics, and associated data items. Process 900 can be carried out, e.g., by a called terminal 306 (or 606, and likewise through the following discussion), or other computing device 104 or 202. Throughout the following discussion, the called terminal 306 is identified for brevity of discussion. However, the term "called" is not a temporal limitation in this discussion. For example, the operations of process 900 can take place before a call is placed or a session is otherwise established to called terminal 306.

In some examples, the called terminal 306 includes one or more processors 212 configured to perform operations described below, e.g., in response to computer program instructions of the client application 226. In some examples, the called terminal 306 includes a communications interface 220 communicatively connectable with at least two access networks of respective, different types. For example, the communications interface 220 can include a 3G transceiver, an LTE transceiver, a WIFI transceiver, and a BLUETOOTH transceiver.

At 902, the called terminal 306 can detect, using the communications interface 220, network service provided by an access network 112. For example, the called terminal 306 can attach to a cellular, WIFI, or other access network 112 configured to carry sessions between called terminal 306 and other terminals, e.g., calling terminal 302. In some examples, block 902 can include determining a roaming state of the called terminal 306, e.g., as discussed below with reference to block 906.

At 904, called terminal 306 can establish connectivity with information server 120, e.g., a presence-information server, via the access network 112. For example, called terminal 306 can register to information server 120, e.g., using a SIP REGISTER transaction or other technique. Examples are discussed herein, e.g., with reference to FIG. 1 or client application 226. In some examples, called terminal 306 can establish the connectivity via the same access network 112 used to carry sessions or a different access network. For example, a cellular terminal within range of a 2G voice service and a WIFI data service may use the WIFI service to communicate with information server 120 and the 2G service to conduct voice sessions.

At 906, called terminal 306 can transmit presence information 908 to the information server 120 via network 106, e.g., via the access network 112. For example, called terminal 306 can transmit a SIP PUBLISH request including the presence information 908. The presence information 908 can indicate a type of the access network 112. The presence information 908 can additionally or alternatively include other types of information. In the illustrated example, the presence information 908 includes data of functional characteristics 910 indicating the type of the access network 112. Examples are discussed herein, e.g., with reference to messages 308 or 608.

In some examples, block 906 can include determining and reporting a roaming state of called terminal 306. For example, block 906 (or block 902, as noted above) can include determining that the called terminal 306 is roaming in the access network. In some examples, the called terminal 306 can compare the mobile country code (MCC) or mobile network code (MNC) of the access network 112 to a stored list of MCCs and MNCs (e.g., MCC-MNC pairs) that are home access networks. If the MCC or MNC are not in the stored list, called terminal 306 can determine that it is roaming. In other examples, a domain name of an eNodeB, visited P-CSCF, or other component associated with the access network 112 can be compared to a stored home-domain-name list to determine whether the called terminal 306 is roaming.

In some examples, e.g., in response to a determination that called terminal 306 is roaming, block 906 can include determining the presence information comprising an indication that the terminal is roaming in the access network. Examples of roaming indications are discussed herein with reference to Table 1. For example, block 906 can include setting a header or body value in the presence information to indicate roaming.

In some examples, block 906 can be followed by block 902, to await changes in the network service, e.g., due to moving between coverage areas. In some examples, block 906 can be followed by block 912. Some examples omit blocks 912 and 914; other examples include blocks 912 and 914. In some examples, as depicted by the dashed line, block 906 can be followed by block 914. Some examples omit block 914; other examples include block 914. For example, block 906 can be followed by block 914 when functional characteristics have changed.

At 912, called terminal 306 can detect, using the communications interface 220, network service provided by a second access network. For example, when the called terminal 306 enters or leaves a coverage area of a base station of a particular network technology, called terminal 306 can detect the network service in the present coverage area.

At 914, called terminal 306 can transmit second presence information 916 to the information server 120 via network 106, e.g., via access network 112 or via the second access network. The second presence information 916 can indicate a type of the second access network, or other types of information. In the illustrated example, second presence information 916 can include data of second functional characteristics 918 pertaining to the second access network. For example, when called terminal 306 moves from a relatively less-capable access network (e.g., GSM) to a relatively more-capable access network (e.g., LTE), called terminal 306 can provide presence information 916 indicating that it can now participate in sessions having relatively higher functional specifications, e.g., RCS sessions or 720p video sessions.

In some examples in which block 914 follows block 906, the second presence information 916 can include updated information not necessarily related specifically to the second access network. For example, second presence information 916 can that a user has reached a data cap or data-throttling level, that a user has enabled or disabled an altered-cost data-plan option, or that the time of day has moved into or out of a peak-time or off-peak range.

Figure 10:
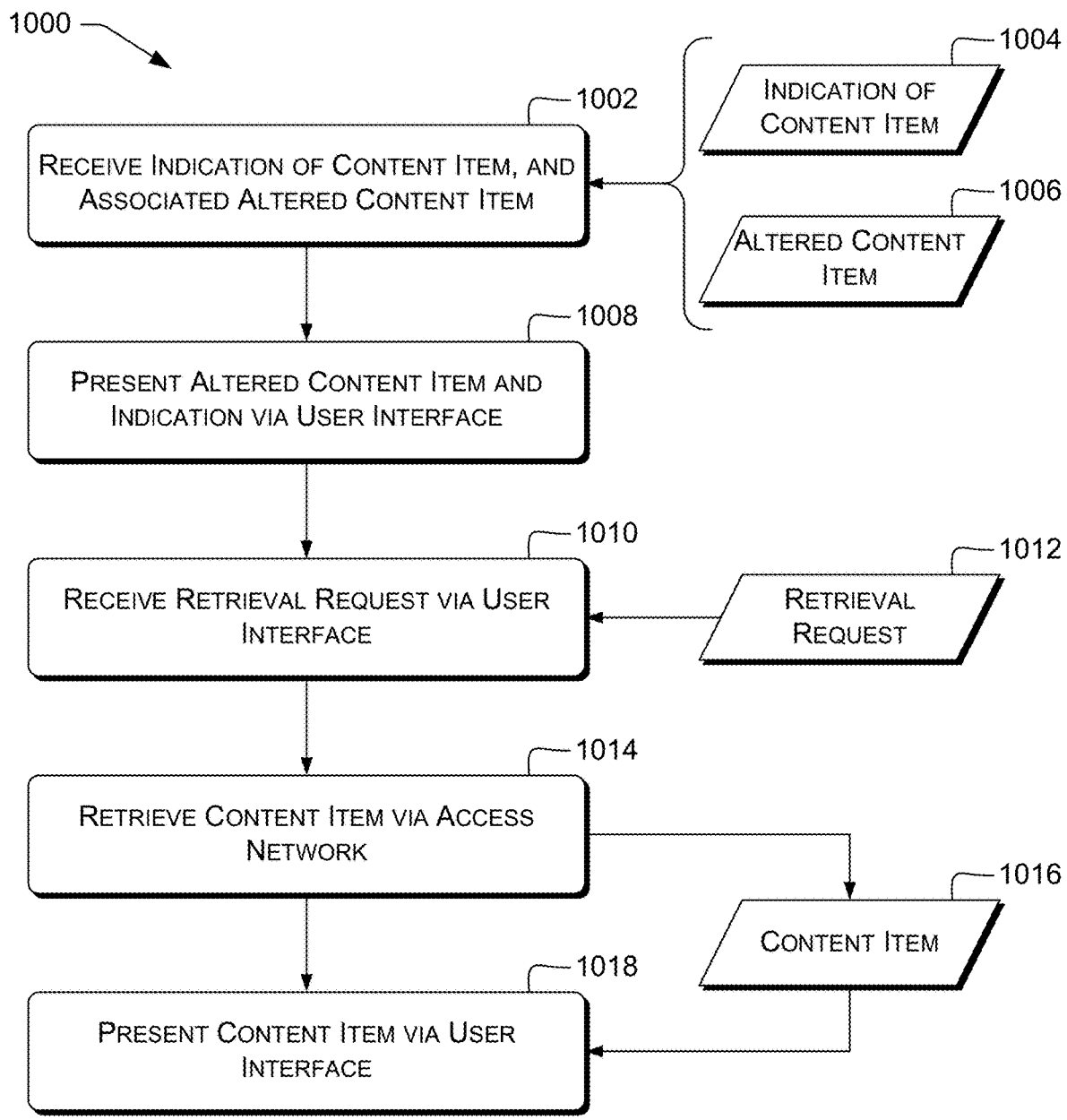
FIG. 10 is a dataflow diagram illustrating an example process for presenting content at a called terminal according to some implementations.

FIG. 10 illustrates an example process 1000 for presenting content at a terminal, and associated data items. Process 1000 can be carried out, e.g., by a called terminal 306 or other devices identified above with reference to process 900. In some examples, processes 900 and 1000 can be used together; in other examples, only one of processes 900 and 1000 is used. In some examples, block 914 can be followed by block 1002. In some examples, called terminal 306 can include a user interface 216.

At 1002, called terminal 306 can receive, e.g., via the access network 112 (or another network 106, and likewise throughout the discussion of this figure), an indication 1004 of a content item and an altered content item 1006 associated with the indication 1004. For example, the indication 1004 can identify a high-resolution photo or video, or an RCS text message or other content carried via RCS. The altered content item 1006 can include altered data, e.g., as discussed herein with reference to altered data message 324, blocks 506, 508, or 510, or altered data message 626.

At 1008, called terminal 306 can present, via the user interface 216, the altered content item 1006 and the indication 1004 of the content item. For example, called terminal 306 can present the altered content item 1006 as is, and can present a link or icon indicating that more content is available. The link or icon can represent the indication 1004. For example, indication 1004 can include a Uniform Resource Locator (URL), and block 1008 can include presenting that URL as a clickable hyperlink associated with the presented altered content item 1006 in user interface 216. Additionally or alternatively, indication 1004 can include a flag or other value indicating that the content item is available, and block 1008 can include presenting the altered content item 1006 as an active control operable by the user to request the content item.

At 1010, called terminal 306 can receive, via the user interface 216, a request 1012 to retrieve the content item. For example, the request can include a click on a hyperlink, activation of a control, or other data indicating that the user has expressed a desire to access the content item. This permits the user to access desired content items, while alter the probability that the user will be charged extra for exceeding data caps or other functional characteristics 404 of the access network 112.

At 1014, called terminal 306 can retrieve, via the access network 112, the content item 1016. For example, called terminal 306 can download the high-resolution image, or otherwise access content, e.g., through a proxy or format converter. In some examples, block 1014 can include retrieving the content item 1016 via a different access network, e.g., a higher-capability access network. Examples of changing access networks can be discussed herein with reference to FIG. 9.

At 1018, called terminal 306 can present, via the user interface 216, the content item 1016. For example, called terminal 306 can present high-resolution images or video, or otherwise provide access to the content item 1016.

In some examples, blocks 1014 and 1018 are performed in that order, in sequence. Additionally or alternatively, blocks 1014 and 1018 can be performed pipelined or simultaneously, e.g., for streaming video. In some examples, block 1014 can include pre-buffering more of a stream on a lower-performance network than on a higher-performance network.

Example Clauses

A: A method comprising, by a terminal of a network: retrieving, from an information server via the network, an indication of functional characteristics associated with a called terminal; determining that the functional characteristics do not satisfy a functional specification associated with a session to be established with the called terminal; determining an altered functional specification based at least in part on the functional characteristics and the functional specification, wherein the functional characteristics satisfy the altered functional specification; and initiating an altered session with the called terminal via the network based at least in part on the altered functional specification.

B: The method according to paragraph A, wherein the functional specification indicates a Rich Communication Services (RCS) session and the altered functional specification indicates a Multimedia Messaging Service (MIMS) or Short Messaging Service (SMS) session.

C: The method according to paragraph A or B, wherein: the functional specification indicates a first bit rate for a video; the altered functional specification indicates a second bit rate for an altered video; and the second bit rate is at most a predetermined percentage of the first bit rate.

D: The method according to any of paragraphs A-C, wherein the functional characteristics indicate that the called terminal is connected to a cellular network, and that at least: the called terminal is roaming in the cellular network; the cellular network is a premium network with respect to the called terminal; or the cellular network is of a generation less than the fourth generation (4G).

E: The method according to any of paragraphs A-D, further comprising: determining altered data based at least in part on data of the session and on the altered functional specification; and transmitting the altered data to the called terminal via the network within the altered session.

F: The method according to paragraph E, further comprising: downsampling at least one image in the data of the session to provide at least part of the altered data.

G: The method according to any of paragraphs A-F, wherein the information server is a presence server and the retrieving comprises: transmitting a Session Initiation Protocol (SIP) SUBSCRIBE or OPTIONS request to the information server; and receiving a SIP transmission from the information server, the SIP transmission comprising the indication of the functional characteristics associated with the called terminal.

H: The method according to paragraph G, wherein the SIP transmission comprises presence information including the indication of the functional characteristics.

I: The method according to paragraph H, wherein the SIP transmission comprises a Presence Information Data Format (PIDF) body that includes the presence information.

J: At least one tangible, non-transitory computer-readable medium storing instructions that, when executed by at least one processor, cause the at least one processor to perform operations comprising: receiving, via a network, a first invitation message from a calling terminal, wherein the first invitation message identifies a called terminal and is associated with a functional specification; determining that functional characteristics associated with the called terminal do not satisfy the functional specification; determining a second invitation message based at least in part on the functional characteristics and the functional specification, wherein the second invitation message is associated with an altered functional specification satisfied by the functional characteristics; and transmitting the second invitation message via the network to the called terminal.

K: The at least one tangible, non-transitory computer-readable medium according to paragraph J, the operations further comprising, before determining the second invitation message, retrieving, via the network and from an information server, an indication of the functional characteristics associated with the called terminal.

L: The at least one tangible, non-transitory computer-readable medium according to paragraph J or K, the operations further comprising, before receiving the first invitation message: transmitting a subscription message to an information server via the network, wherein the subscription message is associated with the called terminal; and receiving, from the information server and via the network, an indication of the functional characteristics associated with the called terminal.

M: The at least one tangible, non-transitory computer-readable medium according to any of paragraphs J-L, wherein: the second invitation message is associated with a communication session; and the operations further comprise, after transmitting the second invitation message: receiving data of the communication session from the calling terminal via the network; determining altered data based at least in part on the data of the communication session and on the altered functional specification; and transmitting the altered data to the called terminal via the network.

N: The at least one tangible, non-transitory computer-readable medium according to any of paragraphs J-M, wherein: the second invitation message is associated with a communication session; and the operations further comprise, after transmitting the second invitation message: receiving data of the communication session from the called terminal via the network; determining upgraded data based at least in part on the data of the communication session and on the functional specification; and transmitting the upgraded data to the calling terminal via the network.

O: A terminal of a telecommunications network, the terminal comprising: a communications interface communicatively connectable with at least two access networks of respective, different types; at least one processor; and a memory storing instructions that, when executed by the at least one processor, cause the at least one processor to perform operations comprising: detecting, using the communications interface, network service provided by an access network; establishing connectivity with a presence-information server via the access network; and transmitting presence information to the presence-information server via the access network, the presence information indicating a type of the access network.

P: The terminal according to paragraph O, the operations further comprising: detecting, using the communications interface, network service provided by a second access network; and transmitting second presence information to the presence-information server, the second presence information indicating a type of the second access network.

Q: The terminal according to paragraph O or P, the operations further comprising: determining that the terminal is roaming in the access network; and determining the presence information comprising an indication that the terminal is roaming in the access network.

R: The terminal according to any of paragraphs OQ, wherein: the terminal further comprises a user interface; and the operations further comprise: receiving, via the access network, an indication of a content item and an altered content item associated with the indication; presenting, via the user interface, the altered content item and the indication of the content item; in response, receiving, via the user interface, a request to retrieve the content item; retrieving, via the access network, the content item; and presenting, via the user interface, the content item.

S: The terminal according to any of paragraphs OR, wherein: the terminal further comprises a user interface; and the operations further comprise: receiving, via the access network, an indication of a content item and an altered content item associated with the indication; presenting, via the user interface, the altered content item and the indication of the content item; receiving, via the user interface, a request to retrieve the content item; in response, retrieving, via a second access network different from the access network, the content item; and presenting, via the user interface, the content item.

T: The terminal according to any of paragraphs O-S, wherein the operations comprise determining a Presence Information Data Format (PIDF) message body that includes the presence information.

U: A computer-readable medium, e.g., a computer storage medium, having thereon computer-executable instructions, the computer-executable instructions upon execution configuring a computer to perform operations as any of paragraphs A-I recites.

V: A device comprising: a processor; and a computer-readable medium, e.g., a computer storage medium, having thereon computer-executable instructions, the computer-executable instructions upon execution by the processor configuring the device to perform operations as any of paragraphs A-I recites.

W: A system comprising: means for processing; and means for storing having thereon computer-executable instructions, the computer-executable instructions including means to configure the system to carry out a method as any of paragraphs A-I recites.

X: A device comprising: a processor; and a computer-readable medium, e.g., a computer storage medium, having thereon computer-executable instructions, the computer-executable instructions upon execution by the processor configuring the device to perform operations as any of paragraphs J-N recites.

Y: A system comprising: means for processing; and means for storing having thereon computer-executable instructions, the computer-executable instructions including means to configure the system to carry out a method as any of paragraphs J-N recites.

Z: A method, comprising performing operations as any of paragraphs J-N recites.

AA: A computer-readable medium, e.g., a computer storage medium, having thereon computer-executable instructions, the computer-executable instructions upon execution configuring a computer to perform operations as any of paragraphs O-T recites.

AB: A method, comprising performing operations as any of paragraphs O-T recites.

CONCLUSION

Various examples permit controlling sessions, e.g., outgoing sessions from a calling terminal to a called terminal, based on access-network presence capabilities. In some examples described above, a called terminal capable of receiving rich communication sessions via RCS reports its access-network type or other network-based restrictions ("functional characteristics") to a presence server. The calling terminal originating an RCS session adjusts the types or sizes of media it sends based on what the called terminal can receive. For example, the calling terminal can send a high-resolution image to an LTE-connected terminal and a low-resolution version of the same image to a GSM-connected terminal. Additionally or alternatively, the RCS messaging server (RMS) in the originating IMS can perform those transformations. These and other examples can permit interoperation between terminals even when the called access network does not support some transmissions that the calling access network does (or vice versa). In various examples, altering a session can additionally or alternatively be referred to as "downgrading," "reducing," or "modifying" (and likewise for similar terms).

Some examples herein are described in the context of a VoLTE network with SIP signaling for clarity of explanation. However, other networks and signaling systems employing operations described herein are encompassed within this disclosure. For example, techniques herein can be used with publish/subscribe protocols such as ZEROMQ running over IP networks. Similarly, this disclosure refers to similar operations being performed by protocols evolved from IP, SIP, and VoLTE.

Some examples herein are described in the context of functional characteristics for clarity of explanation. However, other types of requests can be processed as described herein. For example, described example techniques for the handling of functional characteristics and responses by core network devices or computing devices (e.g., terminals) can additionally or alternatively be used for handling of data other than functional characteristics.

Example data transmissions (parallelograms) in FIGS. 1, 2, 4, 7, 9, and 10; example data exchanges in the call flow diagrams of FIGS. 3 and 6; and example blocks in the process diagrams of FIGS. 4, 5, and 7-10 represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the operations or transmissions are described is not intended to be construed as a limitation, and any number of the described operations or transmissions can be executed or performed in any order, combined in any order, subdivided into multiple sub-operations or transmissions, and/or executed or transmitted in parallel to implement the described processes.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances. Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

Furthermore, although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims. Moreover, in the claims, any reference to a group of items provided by a preceding claim clause is a reference to at least some of the items in the group of items, unless specifically stated otherwise.

What is claimed is:

1. A method comprising, by a mobile terminal of a network:
retrieving, from an information server via the network, an indication of functional characteristics associated with a called terminal;
determining that the functional characteristics do not satisfy a functional specification associated with an initial session by which data is to be exchanged with the called terminal;
determining an altered functional specification based at least in part on the functional characteristics and the functional specification, wherein the functional characteristics satisfy the altered functional specification;
initiating an altered session with the called terminal via the network based at least in part on the altered functional specification;
downsampling content in data of the initial session;
determining altered data based at least in part on the downsampled content in the data of the initial session and on the altered functional specification; and
transmitting the altered data to the called terminal via the network within the altered session instead of within the initial session.

2. The method according to claim 1, wherein the functional specification indicates a Rich Communication Services (RCS) session and the altered functional specification indicates a Multimedia Messaging Service (MMS) or Short Messaging Service (SMS) session.

3. The method according to claim 1, wherein:
the functional specification indicates a first bit rate for a video;
the altered functional specification indicates a second bit rate for an altered video; and
the second bit rate is at most a predetermined percentage of the first bit rate.

4. The method according to claim 1, wherein the functional characteristics indicate that the called terminal is connected to a cellular network, and that at least:
the called terminal is roaming in the cellular network;
the cellular network is a premium network with respect to the called terminal; or
the cellular network is of a generation less than the fourth generation (4G).

5. The method according to claim 1, further comprising:
downsampling at least one image in the data of the initial session to provide at least part of the altered data.

6. The method according to claim 1, wherein the information server is a presence server and the retrieving comprises:
transmitting a Session Initiation Protocol (SIP) SUBSCRIBE or OPTIONS request to the information server; and
receiving a SIP transmission from the information server, the SIP transmission comprising the indication of the functional characteristics associated with the called terminal.

7. The method according to claim 6, wherein the SIP transmission comprises presence information including the indication of the functional characteristics.

8. The method according to claim 7, wherein the SIP transmission comprises a Presence Information Data Format (PIDF) body that includes the presence information.

9. At least one tangible, non-transitory computer-readable medium storing instructions that, when executed by at least one processor, cause the at least one processor to perform operations comprising:
receiving, via a network, a first invitation message from a calling terminal, wherein the first invitation message identifies a called terminal and is associated with a functional specification;
determining that functional characteristics associated with the called terminal do not satisfy the functional specification;
determining a second invitation message based at least in part on the functional characteristics and the functional specification, wherein:
the second invitation message is associated with an altered functional specification satisfied by the functional characteristics; and
the second invitation message is associated with a communication session;
transmitting the second invitation message via the network to the called terminal;
after transmitting the second invitation message, receiving data of the communication session from the calling terminal via the network;
determining second data as at least one data chosen from altered data and upgraded data, the second data determined based at least in part on the data of the communication session;
the second data determined as altered data based at least in part on the altered functional specification, responsive to an altering operation;
the second data determined as upgraded data based at least in part on the functional specification, responsive to an altering operation in reverse; and
transmitting the second data to the called terminal via the network.

10. The at least one tangible, non-transitory computer-readable medium according to claim 9, the operations further comprising, before determining the second invitation message, retrieving, via the network and from an information server, an indication of the functional characteristics associated with the called terminal.

11. The at least one tangible, non-transitory computer-readable medium according to claim 9, the operations further comprising, before receiving the first invitation message:
transmitting a subscription message to an information server via the network, wherein the subscription message is associated with the called terminal; and
receiving, from the information server and via the network, an indication of the functional characteristics associated with the called terminal.

12. A terminal of a telecommunications network, the terminal comprising:
a communications interface communicatively connectable with at least two access networks of respective, different types;
a user interface;
at least one processor; and
a memory storing instructions that, when executed by the at least one processor, cause the at least one processor to perform operations comprising:
detecting, using the communications interface, network service provided by an access network;
establishing connectivity with a presence-information server via the access network;

transmitting presence information to the presence-information server via the access network, the presence information indicating a type of the access network;

receiving, via the access network, an indication of a content item and an altered content item associated with the indication, the content item and the altered content item corresponding to higher resolution content and lower resolution content, respectively;

presenting, via the user interface, the altered content item and a link or icon representing the indication of the content item;

subsequently, receiving, via the user interface, a request to retrieve the content item;

in response to the received request to retrieve the content item, retrieving, via a second access network that is different from the access network, the content item; and presenting, via the user interface, the content item.

13. The terminal according to claim 12, the operations further comprising:

detecting, using the communications interface, network service provided by the second access network; and transmitting second presence information to the presence-information server, the second presence information indicating a type of the second access network.

14. The terminal according to claim 12, the operations further comprising:

determining that the terminal is roaming in the access network; and determining the presence information comprising an indication that the terminal is roaming in the access network.

15. The terminal according to claim 12, wherein the operations comprise determining a Presence Information Data Format (PIDF) message body that includes the presence information.

16. The method according to claim 1, wherein the initial session includes an initial communication session, and wherein downsampling the content further comprises downsampling the content in the data of the initial communication session, thereby reducing a resolution of the content in the data of the initial communication session.

17. The method according to claim 1, wherein the functional characteristics represent attributes including at least one value of a bandwidth value and a throughput cap value of a called access network, and the attributes restrict types of sessions that are available to the called terminal.

18. The method according to claim 1, wherein determining the altered functional specification further comprises:

determining the altered functional specification such that at least one value chosen from a bandwidth value and a throughput cap value of a called access network satisfies the altered functional specification; and responsive to the indication of the functional characteristics retrieved from the information server, performing at least one alteration for the altered session chosen from a first alteration of reducing a resolution of an image in the data of the initial session and a second alteration of converting a session type from a first session type to a second session type.

19. The method according to claim 18, wherein the at least one alteration chosen from the first alteration of reducing the resolution of the image in the data of the initial session and the second alteration of converting the type of the communication session from the first communication session type to the second communication session type, is performed transparently to a user of the called terminal.

20. The method according to claim 1, wherein the initial session and the altered session include an initial communication session and altered communication session, respectively, wherein the altered communication session is initiated by the mobile terminal based on a reduced resolution of the content in the data of the initial session or on a new type of communication session, and wherein determining the altered data further comprises determining the altered data based at least in part on the downsampled content in the data of the initial communication session.

* * * * *